United States Patent

Shigematsu et al.

[11] Patent Number: 6,080,471
[45] Date of Patent: Jun. 27, 2000

[54] NON-WOVEN FABRIC FOR ALKALI CELL SEPARATOR AND PROCESS FOR PRODUCING THE SAME

[75] Inventors: Toshihiro Shigematsu; Yoshitami Ishikawa; Yasuyuki Oku, all of Tokyo, Japan

[73] Assignee: Mitsubishi Paper Mills Limited, Tokyo, Japan

[21] Appl. No.: 08/911,018

[22] Filed: Aug. 13, 1997

[30] Foreign Application Priority Data

Feb. 17, 1995 [JP] Japan .................................. 7-029387
Mar. 22, 1995 [JP] Japan .................................. 7-062937
Jan. 22, 1996 [JP] Japan .................................. 8-008208
Feb. 16, 1996 [WO] WIPO .......................... PCTJP9600333

[51] Int. Cl.[7] ................................ B32B 5/24; D04H 3/02
[52] U.S. Cl. ............................... 428/311.11; 428/311.51; 428/913; 28/104; 162/157.5; 264/423; 264/175
[58] Field of Search ..................... 428/311.11, 311.51, 428/913; 28/104; 162/157.5; 264/423, 175

[56] References Cited

FOREIGN PATENT DOCUMENTS

| | | |
|---|---|---|
| 61-12960 | 1/1986 | Japan . |
| 4-34057 | 2/1992 | Japan . |
| 4-167355 | 6/1992 | Japan . |
| 5-182654 | 7/1993 | Japan . |
| 6-251760 | 9/1994 | Japan . |
| 6-295715 | 10/1994 | Japan . |
| 7-29561 | 1/1995 | Japan . |
| 7-29562 | 1/1995 | Japan . |
| 7-142047 | 6/1995 | Japan . |
| 7-153441 | 6/1995 | Japan . |
| 7-220713 | 8/1995 | Japan . |

*Primary Examiner*—Christopher Raimund
*Attorney, Agent, or Firm*—Pillsbury Madison & Sutro

[57] ABSTRACT

The present invention provides a non-woven fabric for an alkali cell separator capable of preventing active materials from transfer, and having distinguished electrolyte solution absorbability and retainability in spite of a small areal weight and also provides a process for producing the same. The non-woven fabric is substantially free from perforations and has a center surface average roughness SRa of not more than 13 $\mu$m at streaks of entanglement on at least one side of the non-woven fabric, a maximum pore diameter of not more than 50 $\mu$m and a water absorbability under pressure of not less than 20 g/m$^2$, and a standard deviation of pore diameter distribution of not more than 20 $\mu$m, as determined by bubble point method.

21 Claims, 5 Drawing Sheets

NON-WOVEN FABRIC FOR ALKALI CELL SEPARATOR AND PROCESS FOR PRODUCING THE SAME

TECHNICAL FIELD

The present invention relates to a non-woven fabric for separators in alkali cells such as nickel/cadmium cells, nickel/hydrogen cells, etc., which is used to prevent occurrence of any short circuit between a positive pole and a negative pole of an alkali cell by the presence thereof therebetween, to retain an electrolyte solution therein sufficiently and assure smooth progress of electromotive reaction.

BACKGROUND ART

Owing to distinguished charging and discharging characteristics and overcharging and over discharging characteristics and repeated use with a long life, alkali cells are widely used in electronics equipment of remarkably smaller sizes and lighter weights. Characteristics of such alkali cells are largely dependent also on characteristics of non-woven fabrics for alkali cell separator.

The following conditions are required as general functions of non-woven fabrics for alkali cell separators.

(1) They can physically separate a positive pole and a negative pole from each other, (2) They have an electrical insulatability high enough to prevent occurrence of any short circuit, (3) They have a sufficient resistance to an electrolyte solution, (4) They have a sufficient resistance to electrochemical oxidation, (5) They have a low electrical resistance in an electrolyte solution impregnated state, (6) They can be readily wettable with an electrolyte solution and have a high electrolyte solution retainability, (7) They have strength and rigidity high enough to withstand during the cell assembling step, (8) They will not discharge any harmful substance to the cells, and (9) They have a distinguished permeability of oxygen gas generated at the positive pole when charged.

Accordingly, non-woven fabrics made by a dry process from polyamide fibers of 6-nylon, 6,6-nylon, etc., or polyolefin-based fibers of core-and-sheath type, whose core member is made from polypropylene and whose sheath member from polyethylene, have been so far used as non-woven fabrics for alkali cell separators.

Non-woven fabrics for alkali cell separators formed by the dry process have had large fluctuations in areal weight, and thus non-woven fabrics having a larger areal weight have been formed, followed by crushing through a hot calender before use. Such non-woven fabrics have had a high mechanical strength and a distinguished cell processability, whereas there has been such a problems as an incapability to lower the areal weight. In recent attempts to meet the requirements for a higher cell capacity by increasing the amount of electrode active materials or lowering the areal weight of separator to make the separator thinner, such problems have arisen as occurrences of detached active materials transfer and reduction of electrolyte solution retainability.

As a means of solving these problems, an alkali cell separator made from melt-blow non-woven fabrics has been proposed. The melt-blow non-woven fabrics comprise very fine fibers and thus it is possible to make the non-woven fabrics smaller pore diameters or a higher void ratio. That is, in spite of the alkali cell separator as made thinner to some extent, transfer of detached active materials can be prevented and the desired the electrolyte solution retainability can be maintained.

However, the alkali cell separator made from the melt-blow non-woven fabrics is made from finer melt-spun fibers finer obtained by injecting a high speed hot air stream to the fibers from both sides while maintaining the melt-spun state, and collected on a screen. Thus, owing to their so low mechanical strength and still so large fluctuations in the areal weight, the melt-blow non-woven fabric has such problems that limit to lowering the areal weight cannot be made smaller than some limit and it is difficult to conduct rapid charging, because of low gas permeability, that is, an incapability to release a large amount of generated reaction gas and a consequent increase in the inside pressure of the cell, when the amount of electrode materials is to be increased.

As a means of solving these problems, JP-A-5-182654 proposes a cell separator made by integrating a melt-blow non-woven fabric with a hydroentangled non-woven fabric obtained by hydroentangling treatment of a single short fiber web or with a hydroentangled non-woven fabric obtained by hydroentangling treatment of a single short fiber web and a single meet-flow webs together, as laid upon each other, by hot press fusion lamination.

As measures against formation of perforations through the melt-blow non-woven fabric and consequent enlargement of maximum pore diameter in case of integration by lamination of a melt-blow non-woven fabric and a short fiber non-woven fabric through injection of high pressure water, the above-mentioned cell separator can be prevented from the transfer of electrode active materials and can be improved in the electrolyte solution retainability by the presence of the melt-blow non-woven fabric layer and also can be improved in the strength, gas permeability and electrolyte solution retainability by the presence of the hydroentangled non-woven fabric layer. However, for the stable, industrial-scale production of such cell separators, the areal weight must be inevitably made larger throughout the entire separator. When it is tried to lower the areal weight, productivity will be considerably lowered. Thus, mass production of such cell separator is still at a premature stage.

JP-A-7-29561 proposes a cell separator made by blending short fibers of splittable composite fibers comprising a polyolefin polymer and an ethylene/vinyl alcohol copolymer with heat-fusible composite fibers and short fibers of rigid fibers having larger deniers than those of very fine fibers resulting from splitting of the splittable composite fibers and also than those of the heat-fusible composite fibers, followed by a wet web-forming process, treatment of the resulting wet process-formed non-woven fabric with high pressure water stream and hot calender finishing, and also proposes a process for producing the same.

The above-mentioned cell separator can be endowed with a mechanical strength by hot fusion of the blended heat-fusible fibers and three-dimensional entanglement of member fibers through the high pressure water stream treatment, and furthermore can be endowed with some electrolyte solution retainability by splitting the splittable fibers into finer fibers through the high pressure water stream treatment.

However, in the high pressure water stream treatment of the wet process-formed web, streaks of entanglement remain on the wet process-formed web and also perforations are formed therethrough, resulting in enlargement of maximum pore diameters and consequent failure to completely prevent the active materials from transfer.

Heat fusion of heat-fusible fibers will reduce the electrolyte solution-retaining space, resulting in lowering the solution retainability and deterioration of solution absorbability as drawbacks.

Thus, to completely prevent the active material from transfer and ensure the electrolyte solution retainability, there is no other way than to increase the areal weight of the wet process-formed web. One example disclosed in the prior art shows an areal weight of about 70 g/m². This shows that the areal weight is hard to reduce.

In view of the foregoing problems, an object of the present invention has been made to solve the problems and provide a non-woven fabric for an alkali cell separator, which can prevent active materials from transfer and has distinguished electrolyte solution absorbability and retainability in spite of a low areal weight, and also provide a process for producing the same.

DISCLOSURE OF THE INVENTION

As a result of extensive studies to attain the above-mentioned object, the present inventors have established an invention of a non-woven fabric for an alkali cell separator.

That is, the non-woven fabric for an alkali cell separator according to the present invention is a non-woven fabric for an alkali cell separator, which is made by applying a hydroentangling treatment to a wet process-formed polyolefin-based fiber web, followed by a corona discharge treatment and a calender treatment.

According to the first aspect of the present invention, the present non-woven fabric is characterized in that center surface average roughness SRa at streaks of entanglement on at least one side of the non-woven fabric is not more than 13 $\mu$m, the maximum pore diameter is not more than 50 $\mu$m and the water absorbability under pressure is not less than 20 g/m².

Furthermore, a process for producing a non-woven fabric for an alkali cell separator according to the present invention is characterized by applying a hydroentangling treatment to a surface of a wet process-formed polyolefin-based fiber web by use of columnar water stream jet nozzles each in such a shape that an injection outlet opening is broader than a water stream inlet opening, the jet nozzles being provided in an injector of a hydroentangling apparatus, followed by a corona discharge treatment of the entangled web surface and by a calender treatment thereof.

Furthermore, the columnar water stream jet nozzles each in such a shape that the injection outlet opening is broader than the water stream inlet opening is characterized in that the jet nozzles are provided in the injector at least at the last stage.

According to the second aspect of the present invention, the present non-woven fabric for an alkali cell separator is characterized in that the standard deviation of pore diameter distribution, as determined by bubble point method, is not more than 20 $\mu$m and a percentage of number of pores falling within a range of average pore diameter ±2 $\mu$m is not less than 35% of total number of pores in the entire non-woven fabric and the non-woven fabric is subjected to a corona discharge treatment.

According to the third aspect of the present invention, the present non-woven fabric for an alkali cell separator is characterized in that the non-woven fabric is a non-woven fabric substantially free from perforations therethrough, formed mainly from polyolefin-based fibers partially containing an ethylene/vinyl alcohol copolymer or cross-linked polyethylene oxide and subjected to a corona discharge treatment, where a peak area ratio of oxygen elements (O) to carbon elements (C) (O/C ratio) on the surface of the non-woven fabric and that at an intermediate position in the thickness direction thereof, as determined by electron spectroscopy (ESCA), are 0.50 to 1.85 and 0.45 to 1.40, respectively.

Preferable, the peak ratio of oxygen elements (O) to carbon elements (C) (O/C ratio) on the surface of the present non-woven fabric for an alkali cell separator and that at the intermediate position in the thickness direction thereof, as determined by electron spectroscopy (ESCA), are 0.55 to 1.50 and 0.48 to 1.20, respectively.

Furthermore, a non-woven fabric for an alkali cell separator according to the present invention is characterized in that the non-woven fabric is a non-woven fabric for an alkali cell separator substantially free from perforations therethrough, formed mainly from finely creased polyolefin-based fibers partially containing an ethylene/vinyl alcohol copolymer and having a large number of fine creases on the surface of fibers and subjected to a corona discharge treatment, where a peak ratio of oxygen elements (O) to carbon elements (C) (O/C ratio) on the surface of the non-woven fabric and that at an intermediate position in the thickness direction thereof, as determined by electron spectroscopy (ESCA), are 0.60 to 1.35 and 0.50 to 1.00, respectively.

Furthermore, a process for producing a non-woven fabric for an alkali cell separator according to the present invention is characterized by forming a non-woven fabric mainly from polyolefin-based fibers partially containing an ethylene/vinyl alcohol copolymer or cross-linked polyethylene oxide, and subjecting the non-woven fabric to a corona discharge treatment by use of a multi-electrode having a round electrode tip and at a discharge intensity of not more than 20.0 w/cm², thereby making a peak ratio of oxygen elements (O) to carbon elements (C) (O/C ratio) on the surface of the non-woven fabric and that at an intermediate position in the thickness direction thereof, as determined by electron spectroscopy (ESCA), 0.05 to 1.85 and 0.45 to 1.40, respectively.

Figure 1:
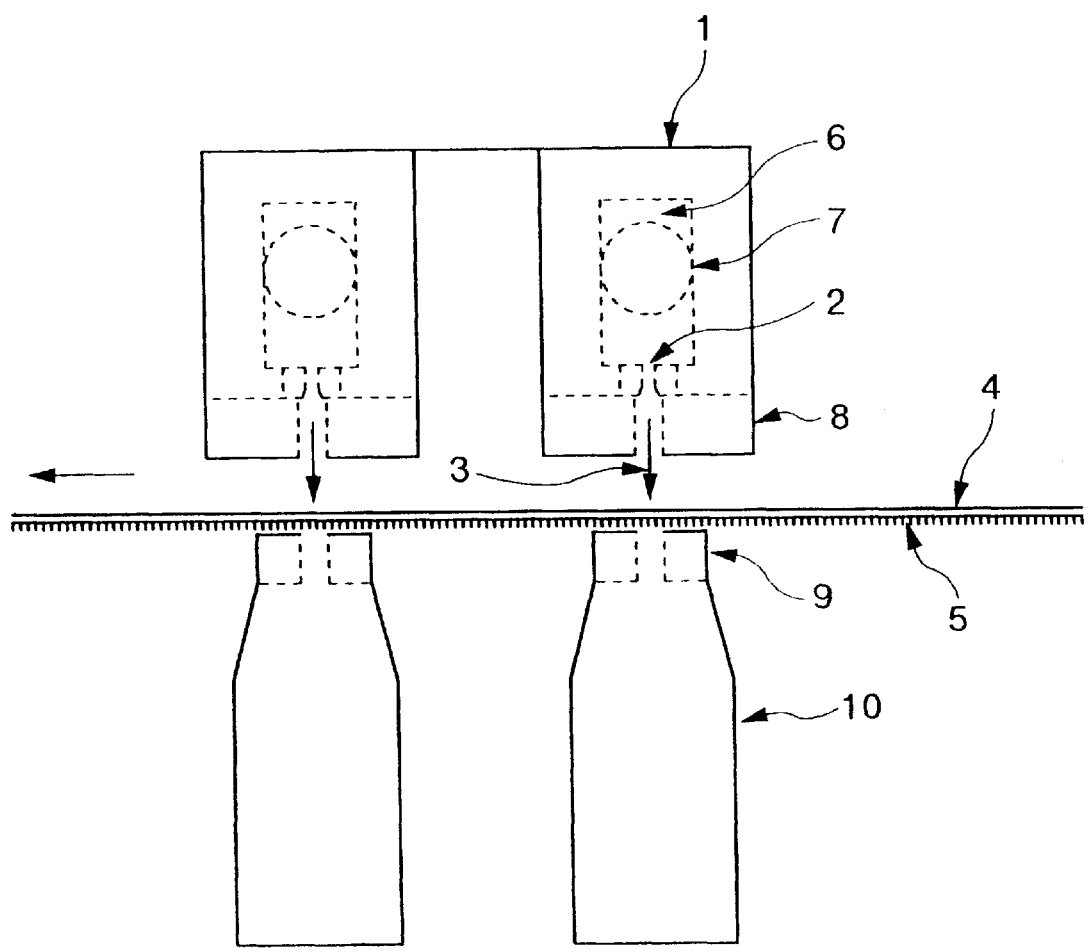
FIG. 1 is a right side view of a hydroentangling apparatus.

In the foregoing drawings, numeral 1 represents an injector, 2 a columnar water stream jet nozzle, 3 a high pressure columnar water stream, 4 a wet process-formed, polyolefin-based fiber web, 5 a porous support, 6 a high pressure columnar water stream inlet, 7 an inside filter, 8 a pressure-resistant plate, 9 a suction plate, 10 a suction box, 11 a water stream inlet opening and 12 an injection outlet opening.

BEST MODE FOR CARRYING OUT THE INVENTION

At first, a non-woven fabric for an alkali cell separator according to the first aspect of the present invention will be described in detail below.

The present non-woven fabric for an alkali cell separator is the one subjected to a hydroentangling treatment and a corona discharge treatment. Uneven streaks of entanglement remain on the surface of the treated non-woven fabric. The larger the unevenness of streaks of entanglement, the larger the center surface average roughness SRa and the more enlarged the maximum pore diameter, resulting in impairing the pore diameter distribution and lowering the solution retainability.

Accordingly, a calender treatment is applied to the non-woven fabric for an alkali cell separator to crush and adjust the non-woven fabric to a predetermined thickness and flatten uneven streaks of entanglement to smooth the surface and make the maximum pore diameter smaller. In case the initial uneven streaks of entanglement are too large, there remain perforations that cannot be remedied even by crushing.

The more crushed the non-woven fabric for an alkali cell separator by the calender treatment, the smaller the center surface average roughness SRa and the smaller the maximum pore diameter.

The center surface average roughness SRa ($\mu$m) after entanglement of at least one side of the calender-treated non-woven fabric for an alkali cell separator is preferably no more than 13 $\mu$m, more preferably not more than 11 $\mu$m.

The present invention is based on a finding of the fact that a value obtained by dividing a thickness D (unit: $\mu$m) of non-woven fabric for an alkali cell separator crushed by the calender treatment by a center surface average roughness SRa (which may be hereinafter referred to as R) after the entanglement shows some definite value, depending on the unevenness of streaks of entanglement before the crushing. That is, it has been found that the larger the uneven streaks of entanglement remaining on the non-woven fabric for an alkali cell separator before the calender treatment are, the smaller the D/R ratio is; and also the smaller the uneven streaks of entanglement are, the larger the D/R ratio is.

It is preferable that for an areal weight of about 40 g/m$^2$ D/R is not less than 8; for an areal eight of about 50 g/m$^2$ D/R is not less than 12; and for an areal weight of 60 g/m$^2$ D/R is not less than 14.

When the D/R ratios for the above-mentioned areal weights are less than the above-mentioned lower limit values, respectively, perforations are inevitably formed through the non-woven fabric for an alkali cell separator and the maximum pore diameter becomes larger than 50 $\mu$m, resulting in a failure to completely prevent the active materials from transfer, impairing the pore diameter distribution and consequently lowering the solution retainability.

The maximum pore diameter of the present non-woven fabric for an alkali cell separator is preferably not more than 50 $\mu$m, more preferably not more than 40 $\mu$m.

Water absorbability under pressure of the present non-woven fabric for an alkali cell separator is preferably not less than 20 g/m$^2$, more preferably not less than 30 g/m$^2$. When the water absorbability under pressure is less than 20 g/m$^2$, the electrolyte solution retained in the non-woven fabric for an alkali cell separator is transferred to the positive pole side due to expansion made by repeated charging to and discharging from the positive pole, and consequently the non-woven fabric for an alkali cell separator has a fear of drying-out. Furthermore, such a problem arises that the electrolyte solution retained in the non-woven fabric for an alkali cell separator is forced out by a large amount of reaction gas generated when rapidly charged.

A process for producing a non-woven fabric for an alkali cell separator according to the present invention will be described in detail below.

At first, explanation will be made of polyolefin-based fiber web formed by a wet web-forming process and intended for water stream entanglement treatment. Polyolefin-based fibers for the present non-woven fabric for an alkali cell separator are not particularly limited, so long as they are based on polyolefin, and for example, single fibers of polypropylene, polyethylene, etc., core-and-sheath type, heat-fusible composite fibers comprising a polypropylene polymer as the core member and a low melting point or high melting point polyethylene or an ethylene/vinyl alcohol copolymer as the sheath member, split type composite fibers comprising a polyolefin polymer and an ethylene/vinyl alcohol copolymer, and the like or mixtures of the foregoing fibers in an appropriate proportion can be used as fibers.

The finer the polyolefin-based fibers to be used, the better from prevention of the maximum pore diameter from enlargement during the hydroentangling treatment. Thus, the diameters of the polyolefin-based fibers are preferably 1 to 20 $\mu$m, more preferably 3 to 10 $\mu$m.

Length of the polyolefin-based fibers to be used is preferably 5 to 15 mm from the viewpoints of dispersibility in the wet web-forming process and strength of entangled non-woven fabric. When the fiber length exceeds 15 mm, dispersion in water is hard to obtain. Thus, not only an appropriate amount of a dispersing agent must be used upon selection, but also such problems arise that the fibers are liable to coalesce after the dispersion to generate twists, snarls, nodules, etc. Furthermore, a concentration of fibers in dispersion must be lowered, resulting in a poor productivity.

When the fiber length is less than 5 mm, on the other hand, the dispersion can be readily obtained, but the fibers are more movable by a high pressure columnar water stream when subjected to the hydroentangling treatment. Thus, the fibers will be hard to bend and entangle and consequently it is difficult to obtain a sheet with a high strength. Furthermore, the entire fibers will move, and thus sliding takes place between the fibers, resulting in development of strains within the entangled web, and development of such a problem as generation of a large number of creases on the entangled web after injection of a high pressure columnar water stream.

Web for the present non-woven fabric for an alkali cell separator is formed from the above-mentioned polyolefin-based fibers by a wet web-forming process. The web can be also formed by other well known processes than the wet web-forming process, such as a card process, a cross-layer process, a random weaver process, etc. Long fibers can be used in the card process or air-lay process, but a uniform web is very hard to obtain and any entangled web of good formation cannot be formed by the high pressure columnar water stream treatment and a spotwise pattern is also observable on the bed when inspected by a transmission light. Thus, to obtain a maximum pore diameter necessary for preventing occurrences of a short circuit, the areal weight must be increased.

On the other hand, the wet web-forming process has a higher production rate than that of the card process, etc. and has an advantage of blending fibers of different diameters or different kinds of fibers in any desired proportion. Furthermore, the wet web-forming process can produce a web of very good formation, as compared with other processes. Thus, the wet web-forming process has a wide application range and an easy pore diameter control.

Description will be made below of hydroentangling treatment.

Figure 2:
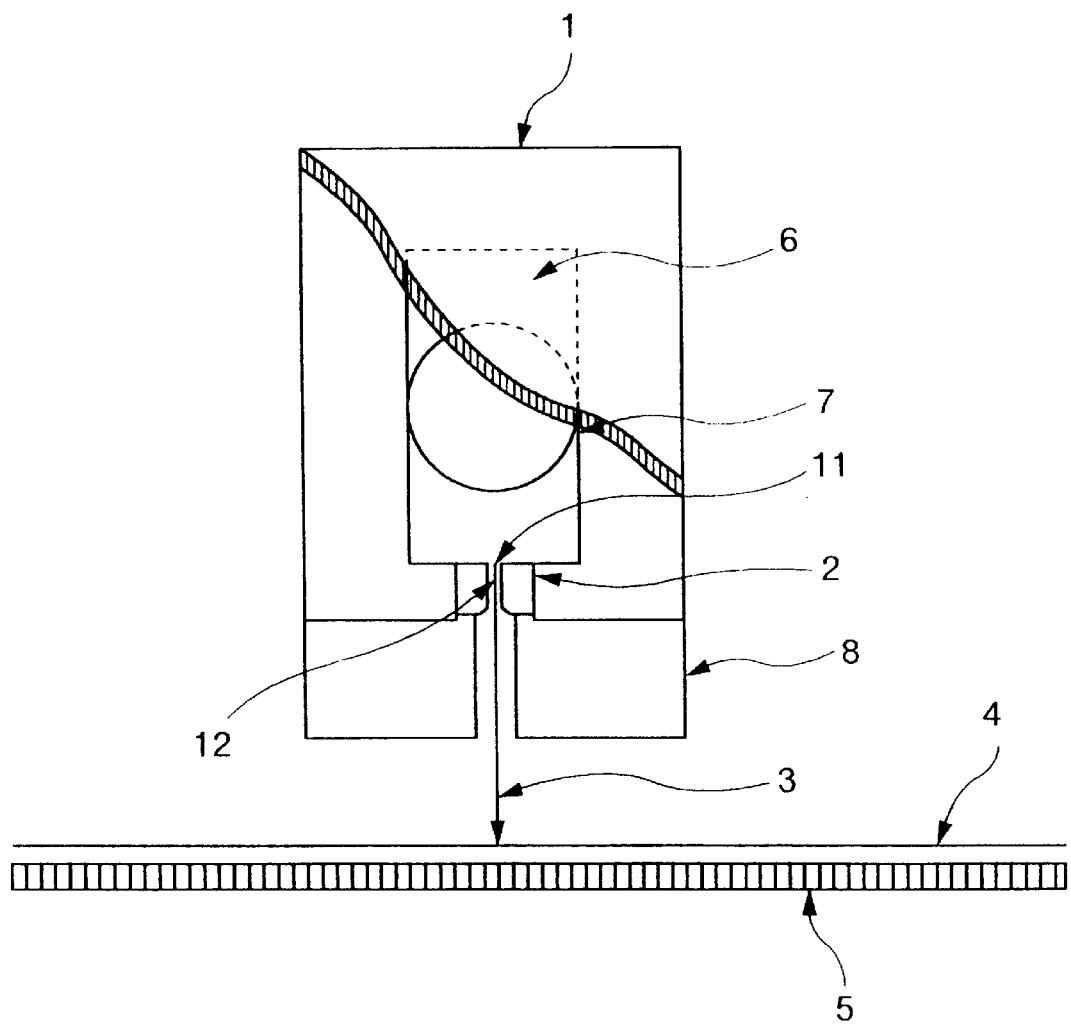
FIG. 2 is an enlarged cross-sectional view of an injector of FIG. 1.

FIG. 1 is a right side view of a hydroentangling apparatus and FIG. 2 is an enlarged cross-sectional view of an injector of FIG. 1. The present invention is characterized by carrying out a hydroentangling treatment with columnar water stream jet nozzles 2 each in such a shape that an injection outlet opening 12 is broader than a water stream inlet opening 11, the jet nozzles being provided in an injection 1 of a hydroentangling apparatus. Furthermore, the columnar water stream jet nozzles are characterized by being provided in the injector at least at the last stage.

Figure 3A:
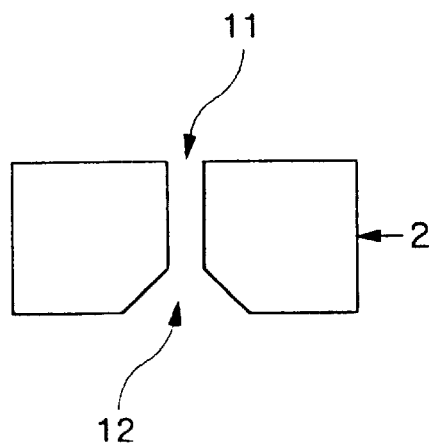
FIGS. 3A and 3B are cross-sectional side views, each showing the shape of one columnar water stream jet nozzle according to the present invention, respectively.
Figure 3B:
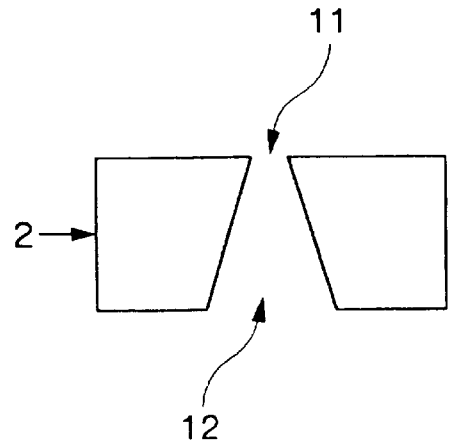
Figure 4A:
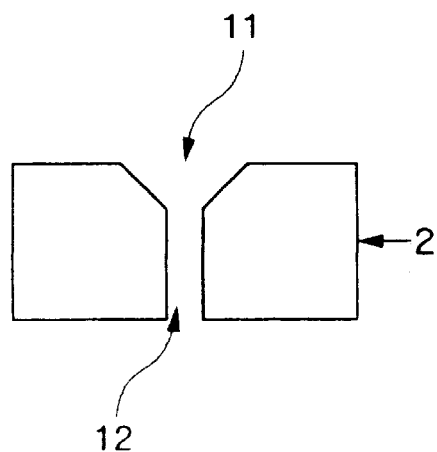
FIGS. 4A and 4B are cross-sectional side views, each showing the shape of one columnar water stream jet nozzle according to the prior art, respectively.
Figure 4B:
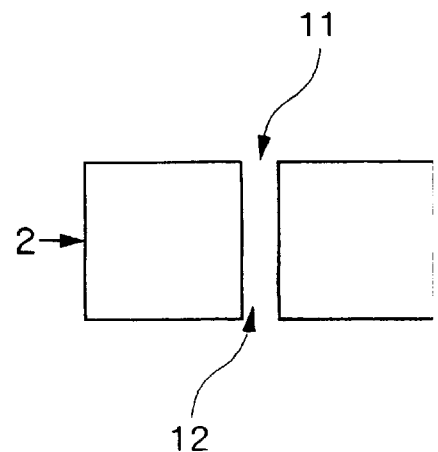

FIGS. 3 are cross-sectional side views, each showing the shape of one columnar water stream jet nozzle according to the present invention, respectively, and FIGS. 4 are cross-sectional side views, each showing the shape of one columnar water stream jet nozzle according to the prior art, respectively.

In case of the shape of FIGS. 3, the amount of water to be injected under the same water pressure can be smaller than in case of the prior art of FIGS. 4, and the water stream can be prevented from spreading-away. Thus, the web can be efficiently entangled and excess water that fails a contribute the entanglement can be saved at the same time. As a result, an entangled web can be formed with less uneven streaks of entanglement and without giving any disturbance to the wet process-formed web.

Columnar water stream jet nozzles provided in the injector at least at the last stage have a nozzle pitch ranging from 0.5 to 1.0 mm and a nozzle diameter of preferably not more than 150 μm, more preferably not more than 100 μm from the viewpoint of making the center surface average roughness smaller.

Hydroentangling treatment comprises placing a wet process-formed web 4 onto a perforated support 5 having a perforation ratio of not more than 40% and a perforation area of not more than 0.04 mm² and injecting a high pressure columnar water stream 3 thereto from a position above the web, while keeping the high pressure columnar water stream 3 and the web 4 in a relative movement to each other, thereby entangling polyolefin-based fibers three-dimensionally.

Relative movement of the web and the high pressure columnar water stream to each other can be carried out simply by placing a conveyor-type support or a drum-type support in rotary movement, where the transfer speed of the support is in a range of 1 to 100 m/min, though dependent on the energy level applied to the web.

When the perforation ratio of the support exceeds 40%, perforations are formed through the web, rendering the maximum pore diameter hard to adjust. The smaller the perforation ratio on the other hand, the more improved the uneven streaks of entanglement on the entangled web. However, when the perforation ratio is too small, the water used for the required entangling treatment fails to pass through the support downward. That is, the water hitting the support rebounds from the support into the web and the rebounding water forces the web to damages. This is not a preferable phenomenon.

The perforated support includes, for example, metallic wires of stainless steel, bronze, etc. or plastic wires of reinforced polyester, polyamide, etc. as weaved, for example, by plain weaving, twilling, etc.

Then, the resulting entangled web is subjected to a corona discharge treatment.

The corona discharge treatment comprises providing an electrode connected to a high voltage generator and a metallic roll covered with a polyester film, hyperon, ER rubber, etc. at an appropriate clearance, applying a voltage of a few thousand to a few ten thousand V at a high frequency thereto, thereby generating a high tension corona, passing the entangled web obtained by the above-mentioned treatment through the clearance at an appropriate speed to allow the entangled web surface to react with ozone or nitrogen oxide formed by the corona, thereby forming carbonyl groups, carboxyl groups, hydroxyl groups and peroxide groups. It seems that these hydrophilic groups contribute to improvement of the affinity of the entangled web to the electrolyte solution.

In the corona discharge treatment according to the present invention, it is important to provide columnar water stream jet nozzles 2 each in such a shape that an injection outlet opening 1 is broader than a water stream inlet opening 11, as shown in FIGS. 3, in an injector at least at the last stage and to use an entangled web obtained by the hydroentangling treatment, because, when a corona discharge treatment is applied to an entangled web having considerly uneven streaks of entanglement, the corona discharge will be concentrated on regions of low areal weight, and corona pinholes having a diameter of 0.2 to 1.0 mm (which may be hereinafter referred to as perforations) can be formed through the entangled web.

A criterion for formation of corona pinholes through the entangled web is set to a maximum pore diameter of more than 60 μm for the entangled web obtained by hydroentangling treatment, at which the pinhole formation has a very high possibility.

Even if an entangled web having a maximum pore diameter of more than 60 μm is subjected to a calender treatment before the corona discharge treatment, thereby making the maximum pore diameter not more than 60 μm, followed by a corona discharge treatment, uneven distribution of areal weight due to uneven streaks of entanglement, once established cannot be remedied, though the possibility of pinhole formation can be reduced. That is, there is still a possibility of pinhole formation. Thus, it is preferable for the hydroentangling treatment to make the uneven streaks of entanglement as little as possible and the maximum pore diameter not more than 60 μm.

Finally, the entangled web resulting from the corona discharge treatment is subjected to a calender treatment to adjust the thickness of non-woven fabric for an alkali cell separator. There is particularly no problem even if the corona discharge treatment and the calender treatment are carried out in a reversed order.

That is, it is preferable from the viewpoint of ease of corona discharge treatment to a deeper region of entangled web to apply a calender treatment to the corona discharge-treated, entangled web, whereas it is preferable from the viewpoint of flattening the entangled surface preventing formation of perforations through the entangled web to apply a corona discharge treatment to the calender-treated, entangled web.

However, the entangled surface of entangled web resulting from the hydroentangling treatment according to the present process is so flat that there is no fear of formation of perforations through the entangled web, and thus the former order of initially carrying out a corona discharge treatment even to a deeper region is preferable from the such necessary characteristics as desired solution absorbability and retainability.

Furthermore, the corona discharge treatment can be carried out again after the calender treatment, but before the cell assembling.

Roll materials for use in the calender treatment include combinations of rubber/rubber, steel/steel, steel/rubber, cotton/steel, and cotton/cotton, among which the combination of cotton/steel is preferable from the viewpoints of workability of thickness adjustment and surface quality after the calender treatment.

When an entangled web having a maximum pore diameter of more than 60 μm and considerably uneven streaks of entanglement, as obtained just after the hydroentangling treatment, is subjected to the calender treatment, such a problem arises that the web is creased at the winding after the calender treatment, impairing the web wound state. Thus, the surface flatness of the entangled web is important even for the calender treatment and it is preferable to make the unevenness of entangled web as little as possible during the hydroentangling treatment.

After the corona discharge treatment, the non-woven fabric for an alkali cell separator may be subjected to a coating treatment or an impregnation treatment with a wetting agent such as a non-ionic surfactant, etc. It is also desirable for suitable use as a non-woven fabric for an alkali cell separator to make the thickness not more than 200 μm, as measured by a micrometer.

In the hydroentangling treatment according to the present invention, the hydroentangling treatment is carried out with columnar water stream jet nozzles each is such a shape that an injection outlet opening is broader than a water stream inlet opening, as provided in an injector at least at the last stage, thereby making the center surface average roughness smaller at streaks of entanglement on the surface of a non-woven fabric for an alkali cell separator, making it possible to lower the areal weight of the non-woven fabric, preventing transfer of active materials in spite of the lower areal weight without any integration by lamination of a fiber web, a melt-blow non-woven fabric, etc., and also making it possible to endow the present non-woven fabric with distinguished solution absorbability and retainability.

A non-woven fabric for an alkali cell separator according to the second aspect of the present invention will be described in detail below. At first, explanation will be made of fibers constituting the present non-woven fabric for an alkali cell separator.

Fibers constituting the present non-woven fabric for an alkali cell separator are particularly not limited, so long as they are based on polyolefin, and for example, single fibers of polypropylene, polyethylene, etc.; core-and-sheath type, heat-fusible composite fibers comprising a polypropylene polymer as a core member and low melting point or high melting point polyethylene or an ethylene/vinyl alcohol copolymer as a sheath member; and splittable composite fibers comprising a polyolefin polymer and an ethylene/vinyl alcohol copolymer, etc. can be used for the fibers.

The finer the fibers constituting the present non-woven fabric for an alkali cell separator, the better. Fiber diameter is preferably 1 to 20 μm, more preferably 1 to 10 μm from the viewpoint of a high possibility for narrower pore diameter distribution.

Standard deviation of pore diameter distribution of the non-woven fabric for an alkali cell separator will be smaller for finer fibers, whereas it will be larger for thicker fibers.

Furthermore, the standard deviation of pore diameter distribution depends also on an areal weight. At an equal thickness, the standard deviation will be smaller for a larger areal weight, whereas it will be larger for a smaller areal weight. Furthermore, at an equal areal weight, the standard deviation of pore diameter distribution will be smaller when the thickness is made smaller by crushing, whereas it will be larger when the thickness is kept the same as it is without crushing.

When the standard deviation of pore diameter distribution is made smaller by making the areal weight larger by use of thicker fibers, on the other hard, the electrode capacity is lowered, resulting in deterioration of discharge characteristics as a problem.

It has been found that the standard deviation of pore diameter distribution for the present non-woven fabric for an alkali cell separator is preferably not more than 20 μm, more preferably not more than 10 μm. When the standard deviation of pore diameter distribution is more than 20 μm, the electrolyte solution retainability will be deteriorated, and the electrolyte solution will be forced out of the non-woven fabric for an alkali cell separator when the electrode is swollen, resulting in a high possibility for drying-out.

As to a percentage of number of pores falling within a definite range, i.e. a range of average pore diameter ±2 μm to total number of pores in the entire non-woven fabric, a large percentage shows higher pore uniformity i.e. a higher solution retainability.

It has been found in the present invention that when a percentage of number of pores falling within a range of average pore diameter ±2 μm to total number of pores in the entire non-woven fabric is not less than 35%, preferably not less than 50%, a better solution retainability can be obtained.

Description will be made below of a process for producing the present non-woven fabric for an alkali cell separation.

The present non-woven fabric for an alkali cell separator is characterized in that the standard deviation of pore diameter distribution, as determined by bubble point method, is not more than 20 μm and a percentage of number of pores falling within a range of average pore diameters ±2 m is not less than 35% of total number of pores in the entire non-woven fabric and the non-woven fabric is subjected to a corona discharge treatment.

A web for the present non-woven fabric for an alkali cell separator can be formed from the above-mentioned polyolefin-based fibers or resins by a well known process such as a wet web-forming process, a card process, a spun-bond process a meet-blow process, etc.

Among the above-mentioned web-forming processes, the wet web-forming process and the melt-blow process are preferable from the viewpoint of a capability of making smaller the diameters of fibers constituting a non-woven fabric for an alkali cell separator.

Particularly, the wet web-forming process has such advantages and a higher production rate and a capability of blending different kinds of fibers having different diameters in any desired proportion in the same apparatus. That is, fiber shapes are widely selectable from staple shape, pulp shape, etc., and usable fiber diameters are in a range of not more than 7 μm for fine fibers to that for thick fibers. Webs of very good formation can be obtained by the wet web-forming process, as compared with other processes. Furthermore, splittable composite fibers can be split substantially completely through disintegration using a disintegrator such as a pulper, a high speed mixer, beater, etc. and a dispersion step. Thus, the wet web-forming process has a very wide application range.

According to a further improved process for the non-woven fabric for an alkali cell separator obtained by the wet web-forming process, the web obtained by the wet web-forming process is subjected to a hydroentangling treatment, thereby entangling the polyolefin-based fibers constituting the web three-dimensionally. The tensile strength and breaking elongation of the non-woven fabric for an alkali cell separator can be considerably increased by the hydroentangling treatment, and thus changes in thickness due to stretching forces and winding forces exerted during the cell assembling and due to fatigues as a result of use, etc. can be prevented. The short circuit can be also very effectively prevented thereby.

To improve the affinity of the non-woven fabric comprising olefin-based fibers for an alkali cell separator to an electrolyte solution, a corona discharge treatment is applied to the web in the present invention.

The corona discharge treatment comprises providing an electrode connected to a high voltage generator and a metallic roll covered with a polyester film, hyperon, ER rubber, etc. at an appropriate clearance, applying a voltage of a few thousand to a few ten thousand V at a high frequency thereto, thereby generating a high tension corona, passing the web obtained by the above-mentioned treatment through the clearance at an appropriate speed to allow the web surface to react with ozone or nitrogen oxide formed by the corona, thereby forming carbonyl groups, carboxyl groups, hydroxyl groups and peroxide groups. It seems that these hydrophilic groups contribute to improvement of the affinity of a non-woven fabric for an alkali cell separator to an electrolyte solution. Furthermore, the surfaces of polyolefin-based fibers are partially attacked and brought into a finely branched state by the corona discharge treatment, and consequently the surface area of the non-woven fabric for an alkali cell separator can be increased, contributing to an improvement of a solution retainability of the web.

After the corona discharge treatment, the non-woven fabric for an alkali cell separator may be subjected to a coating treatment or an impregnation treatment with a wetting agent such as a non-ionic surfactant, etc. It is also desirable for suitable use as a non-woven fabric for an alkali cell separator to make the thickness not more than 200 μm, as measured by a micrometer.

In the present invention, the electrolyte solution retainability can be increased, and the electrolyte solution can be prevented from forcing out of the non-woven fabric for an alkali cell separator to eliminate a possibility for drying-out, even if the electrode is swollen, by controlling a standard deviation of pore diameter distribution and a percentage of number of pores falling within a predetermined range and by making finer and more uniform the electrolyte solution-retaining spaces in the non-woven fabric formed by entanglement of polyolefin-based fibers constituting the non-woven fabric for as alkali cell separator.

Furthermore, in the present invention, a non-woven fabric comprising polyolefin-based fibers for an alkali cell separator can be endowed with a distinguished electrolyte solution absorbability at a low cost, without relying on an impregnation treatment with a surfactant, by applying the present non-woven fabric for an alkali cell separator to a corona discharge treatment.

A non-woven fabric for an alkali cell separator and a process for producing the same according to the third aspect of the present invention will be described in detail below. At first, explanation will be made of fibers constituting the present non-woven fabric for an alkali cell separator.

Polyolefin-based fibers partially containing an ethylene/vinyl alcohol polymer or cross-linked polyethylene oxide for use in the present invention include, for example, core-and-sheath type, heat-fusible composite fibers comprising a polyproplene polymer as a core member and an ethylene/vinyl alcohol copolymer as a sheath member; core-and-sheath type, heat-fusible composite fibers having a molecular weight of 1,000,000, comprising a polypropylene polymer as a core member and cross-linked polyethylene oxide and low density polyethylene, for example, into solution in a ratio of 25:75, as a sheath member; splittable composite fibers comprising a polyolefin polymer and an ethylene/vinyl alcohol copolymer; parallel type, composite fibers comprising a polyolefin polymer and an ethylene/vinyl alcohol copolymer, as arranged in parallel; ocean-and-island type, composite fibers comprising a polyolefin-based polymer as an island member and an ethylene/vinyl alcohol copolymer as an ocean member; etc. These fibers may be blended with single fibers of polypropylene, polyethylene, etc., if desired.

Diameters of these fibers are 1 to 20 μm, preferably 1 to 10 μm. The finer the fiber diameters, the better the solution retainability of the non-woven fabric. Below 1 μm, the sheet becomes more compact, deteriorating the gas permeability and lowering the fiber strength. Thus, diameters of less than 1 μm are not preferable because of lower strength of non-woven fabric for an alkali cell separator. Above 20 μm, on the other hand, the solution retainability is unpreferably deteriorated.

Finely creased polyolefin-based fibers mean polyolefin-based fibers partially containing an ethylene/vinyl alcohol copolymer and having a large number of fine creases, i.e. fine irregularities or undulations, on their surfaces. It is preferable that the ethylene/vinyl alcohol copolymer is exposed out of at least parts of fiber surfaces or entire fiber surfaces or constitutes the entire fiber surfaces.

Creases of finely creased polyolefin-based fibers may be formed on the fibers before the formation of a non-woven fabric or formed on the surfaces of polyolefin-based fibers during the course of formation or after the formation of a non-woven fabric, or during the course of corona discharge treatment as will be described in detail below. Creases may be in a resin-raising state, or in a cavity state. In case of the cavity state, it is not objectionable that even the cavity is communicated with the fiber exteriors.

Among the above-mentioned various polyolefin-based fibers, splittable composite fibers comprising a polyolefin polymer and an ethylene/vinyl alcohol copolymer can form fine creases due to shrinkage of ethylene/vinyl alcohol copolymer fibers during the course of drying of formed non-woven fabric after the fiber splitting, and the fine creases so formed can be further increased, i.e. much more formed by a corona discharge treatment as will be described in detail below.

Furthermore, in case of core-and-sheath type, composite fibers comprising a polypropylene copolymer as a core member and an ethylene/vinyl alcohol copolymer as a sheath member, creases are formed on the sheath member by a corona discharge treatment, when conducted on more than a given energy level.

Crease formation on the fiber surfaces can increase the specific surface areas of fibers and has an effect on improvement of an affinity to the electrolyte solution and also on improvement of solution absorbability and retainability of fibers themselves. Furthermore, the clearances between the fibers can be made smaller than those between the non-creased fibers, and the solution absorbability and retainability of the non-woven fabric can be considerably increased due to a synergistic effect of the capillary phenomenon based on the increased number of smaller voids between the fibers themselves and the improved affinity of the fibers themselves to an electrolyte solution.

Explanation will be made of the present process for producing a non-woven fabric for an alkali cell separator. A non-woven fabric can be formed by such well known processes as a wet web-forming process, a card process, a spun-bond process, a melt-blow process, etc.

Among the above-mentioned processes for forming a non-woven fabric, the wet web-forming process and the melt-blow process are preferable from the viewpoint of their capability of making smaller the diameters of fibers constituting a non-woven fabric for an alkali cell separator. Particularly, the wet web-forming process has such advantages as an elevated production rate and its capability of blending different kinds of fibers having different diameters in any desired proportion in one and same apparatus. That is, fiber shapes are widely selectable from staple shape, pulp shape, etc., and applicable fiber diameters are in a range of not more than 7 $\mu$m for the so called fine fibers to that for the so called thick fibers. Webs of very good formation can be obtained by the wet web-forming process, as compared with other processes. Thus, the wet web-forming process has a very wide range of applications. A process for forming a non-woven fabric by a web-forming process will be explained below.

The wet web-forming process comprises disintegrating the fibers for use in the present invention at a desired concentration by a pulper, a high speed mixer or the like, dispersing the disintegrated fibers in a chest or a Bellmer apparatus, thereby preparing a raw material slurry, forming a non-woven fabric by a wet process, using a Fourdrinier paper machine or a cylinder paper machine and drying the non-woven fabric in a drying step to evaporate moistures, while heat fusing a portion of fibers at the same time.

According to a preferable process, the non-woven fabric of polyolefin-based fibers obtained according to the wet web-forming process is subjected to a hydroentangling treatment, thereby entangling the polyolefin-based fibers constituting the non-woven fabric three-dimensionally. The tensile strength and breaking elongation of the non-woven fabric for an alkali cell separator can be considerably increased by the hydroentangling treatment and thus changes in thickness due to stretching forces and winding forces exerted during the course of cell assembling and due to fatigues as a result of use, etc. can be prevented. The short circuit can be also effectively prevented.

The three-dimentionally entangled structure of a non-woven fabric of polyolefin-based fibers enables formation of hydrophilic groups down to a deeper region in the thickness direction of the non-woven fabric by a corona discharge treatment, as will be described in detail below, than to the region of the non-woven fabric that has not been subjected to the three-dimensional entanglement, whereby an unexpected result such as a very distinguished effect on the affinity to an electrolyte solution can be obtained in the present invention.

It is essential for the present non-woven fabric for an alkali cell separator to apply a corona discharge treatment thereto to improve the affinity to an electrolyte solution.

The corona discharge treatment comprises providing an electrode connected to a high voltage generator and a metallic roll covered with a polyester film, hyperon, ER rubber, etc. at an appropriate clearance, applying a voltage of a few thousand to a few ten thousand V at a high frequency thereto, thereby generating a high tension corona, passing the non-woven fabric obtained by the above-mentioned treatment through the clearance at an appropriate speed to allow the surface non-woven fabric to react with ozone or nitrogen oxide generated by the corona, thereby forming carbonyl groups, carboxyl groups, hydroxyl groups and peroxide groups. It seems that these hydrophilic groups can contribute to improvement of the affinity of the non-woven fabric for an alkali cell separator to an electrolyte solution. Furthermore, the surfaces of polyolefin-based fibers are partially attacked and brought into a finely branched stage by the corona discharge treatment, and consequently the surface area of the non-woven fabric for an alkali cell separator an be increased, contributing to an improvement of a solution retainability of the non-woven fabric.

It is preferable to conduct the corona discharge treatment at a discharge intensity of not more than 20.0 w/cm$^2$, preferably in a range of 5.0 to 15.0 w/cm$^2$. The discharge intensity can be defined as a discharge power divided by a discharge electrode area and means an intensity of discharge by a power supplied to the unit area of an electrode. Above 20.0 w/cm$^2$, a pinhole formation problem arises.

A discharge intensity of less than 5.0 w/cm$^2$ is not objectionable, but to obtain the necessary affinity to an electrolyte solution for the separator the corona discharge treatment rate must be lowered or number of units each consisting of several electrodes must be increased or furthermore such an inconvenience arises as a difficulty in the formation of hydrophilic groups down to a deeper region in the thickness direction of the non-woven fabric.

Figure 5A:
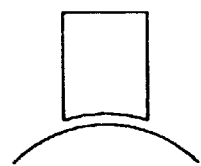
FIGS. 5A, 5B and 5C show bar electrode shapes, respectively.
Figure 5B:
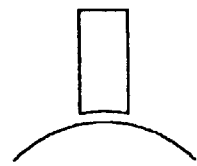
Figure 5C:
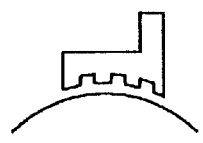
Figure 6A:
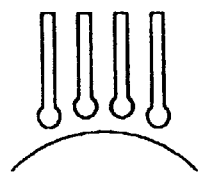
FIGS. 6A, 6B and 6C show multi-electrode shapes, respectively.
Figure 6B:
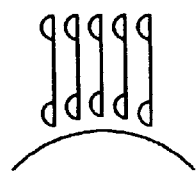

Preferable electrodes for use in the corona discharge treatment according to the present invention are multi-electrodes as shown in FIGS. 6. Electrodes having shapes as shown in FIG. 5 can be used, but at an increased discharge intensity, a whisker discharge is liable to occur at the edges of electrode, resulting in an increased risk of pinhole formation. Thus, the discharge intensity has some limit.

In the present process for producing a non-woven fabric for an alkali cell separator, it is particularly preferable to use an electrode having a round tip end. By use of an electrode having a round tip end, generation of whisker discharge can be prevented and the discharge intensity can be increased up to 20.0 w/cm$^2$. As a result, the hydrophilic groups can be formed down to a deeper region in the thickness direction of the web and the frequency of pinhole formation can be reduced thereby.

The present non-woven fabric for an alkali cell separator is characterized in that a peak area ratio (O/C ratio) as determined by electron spectroscopy (ESCA) after the corona discharge treatment is 0.50 to 1.85 on the surface of the non-woven fabric and 0.45 to 1.40 at an intermediate position in the thickness direction of the non-woven fabric. Preferably, the O/C ratio is 0.55 to 1.50 on the surface of the non-woven fabric and 0.48 to 1.20 at an intermediate position in the thickness direction of the non-woven fabric. The intermediate position in the thickness direction of a non-woven fabric means a center point in the cross-section of the non-woven fabric for an alkali cell separator.

There is a limit to increase in the O/C ratio by the corona discharge treatment on the surface of a non-woven fabric and at an intermediate position in the thickness direction of the non-woven fabric, depending on blending proportions of polyolefin-based fibers constituting the non-woven fabric. Furthermore, an over-increase in the O/C ratio will decrease the solution absorbability to the contrary, and thus it is necessary to select an optimum O/C ratio.

When the O/C ratio is less than 0.50 on the surface of a non-woven fabric, the O/C ratio will be less than 0.45 at the intermediate position thereof, resulting in insufficient formation of hydrophilic groups in the thickness direction of the non-woven fabric. That is, deterioration of the affinity to an electrolyte solution with time will rapidly proceed during the period of storage in the form of non-woven fabrics for an alkali cell separator, and consequently such problems arise as an instability of pouring time of electrolyte solution, when assembled into cells, as a decrease in the electrolyte solution retainability of the non-woven fabric during charging/discharging cycles even after assembled into cells, and consequently as a shorter cell life.

When the fibers constituting a non-woven fabric for an alkali cell separator contain no polyolefin-based fibers partially containing an ethylene/vinyl alcohol copolymer or cross-linked polyethylene oxide as a component, deterioration of the affinity to an electrolyte solution with time will rapidly proceed during the storage period, even if the desired O/C ratio is obtained both on the surface of the non-woven fabric and at the intermediate position in the thickness direction of the non-woven fabric.

Following the corona discharge treatment, the non-woven fabric for an alkali cell separator may be subjected to a coating treatment or an impregnation treatment with a wetting agent such as a non-ionic surfactant, etc. It is also desirable for suitable use as a non-woven fabric for an alkali cell separator to conduct a calender treatment to make the thickness not more than 300 μm, as measured by a micrometer.

Between the case of applying a calender treatment to the corona discharge-treated, entangled web and the case of applying a corona discharge treatment to the calender-treated, entangled web, the former web is preferable because the O/C ratio can be improved throughout the web by the corona discharge treatment due to the lower density of the web.

The non-woven fabric may be subjected again to a corona discharge treatment after the calender treatment but before the cell assembling.

The fist aspect of the present invention will be described further in detail below, referring to Examples, to which the present invention will not be restricted. In Examples, parts and % are all by weight.

EXAMPLE 1

A web was formed from 98 parts of splittable composite fibers having a fineness of 3 denier [0.2 denier (3.9 μm) after fiber splitting] and a fiber length of 6 mm, comprising crystalline polypropylene having an MFR value of 40 and an ethylene/vinyl alcohol copolymer having an ethylene content of 38% by mole, an MFR value of 40 and a saponification degree of 99.6% and from one part of hot water-soluble polyvinyl alcohol fibers (VPW 103: made by Kuraray Co.) having a fineness of 1 denier and a fiber length of 3 mm by a wet web-forming process, using a cylinder paper machine.

Then, the web was transferred onto a perforated support of 100-mesh stainless steel wires and subjected to a hydroentangling treatment by a high pressure columnar water stream at a treating rate of 8 m/min.

Two injectors were used, each injector being provided with columnar water stream jet nozzles having a shape as shown in FIG. 3A, a nozzle pitch of 0.6 mm and a nozzle diameter of 120 μm. At first, one side of the web was subjected to the entanglement and then the back side thereof was subjected to the entanglement under a water pressure of 130 kg/cm$^2$. The maximum pore diameter of the entangled web was 52.9 μm. Then, the entangled web thus obtained was subjected to a corona discharge on both sides of the web. Finally, the web was subjected to a calender treatment at the ordinary temperature to obtain a thickness of 180 μm, as measured by a micrometer, 6.3 mm in diameter, and then cut to obtain non-woven fabrics for an alkali cell separator.

EXAMPLE 2

A non-woven fabric for an alkali cell separator was obtained in the same manner as in Example 1, except that the nozzle pitch of the columnar water stream jet nozzles was changed to 1.0 mn and the nozzle diameter to 150 μm in Example 1.

EXAMPLE 3

A non-woven fabric for an alkali cell separator was obtained in the same manner as in Example 1, except that the areal weight of the web was changed to 45.5 g/m$^2$ and the water pressure to 100 kg/cm$^2$ in Example 1.

EXAMPLE 4

A non-woven fabric for an alkali cell separator was obtained in the same manner as in Example 1, except that the shape of columnar water stream jet nozzles provided in the first injector was changed to that of FIG. 4A and the shape of nozzles provided in the second injector to that of FIG. 3A, and the water pressure to 100 kg/cm$^2$ in Example 1, while keeping the nozzle pitch and the nozzle diameter as unchanged.

EXAMPLE 5

A non-woven fabric for an alkali cell separator was obtained in the same manner as in Example, except that the shapes of the columnar water stream jet nozzles provided in the two injectors were changed to those of FIG. 4A in Example 1.

EXAMPLE 6

A non-woven fabric for an alkali cell separator was obtained in the same manner as in Example 5, except that the thickness of the non-woven fabric for an alkali cell separator was reduced to 149 μm by crushing through a calender treatment in Example 5.

EXAMPLE 7

A non-woven fabric for an alkali cell separator was obtained in the same manner as in Example 5, except that the nozzle pitch of the columnar water stream jet nozzles was changed to 1.0 mm and the nozzle diameter to 150 μm in Example 5.

EXAMPLE 8

A non-woven fabric for an alkali cell separator was obtained in the same manner as in Example 5, except that the nozzle pitch of the columnar water stream jet nozzles was changed to 0.6 mm and the nozzle diameter to 80 μm in Example 5.

The non-woven fabrics for an alkali cell separator obtained in Examples 1 to 8 were evaluated according to the following eluation procedures and the results of evaluation are shown in the following Table 1.

Thickness

Thickness (μm) was evaluated by an average value of measurements of 10 sample sheets, each at 6 different points by a micrometer.

Pore Diameter

Pore diameter was evaluated by a maximum diameter (μm) among measurements by a Coulter porometer (made by PMI Co., USA) according to ASTM F316-86, where the value before the calender treatment is shown as pore diameter 1 and that after the calender treatment is shown as pore diameter 2. Values due to pinholes made by the corona discharge treatment were excluded from the maximum pore diameter valves shown in Table 1.

Center Surface Average Roughness (which may be hereinafter referred to as center surface roughness)

Term "center surface average roughness SRa (μm)" herein used is determined by a contacting needle type, three dimensional surface roughness meter and defined by the following equation (1):

$$SRa = \frac{1}{Sa}\int_0^{W_x}\int_0^{W_y}|f(Z,Y)|dZ\,dY \quad (1)$$

In equation (1) $W_x$ represents a length in the Z-axis direction of a sample surface region (crossing direction at the right angle to the streaks of entanglement given by the hydroentangling treatment); $W_y$ a length in the Y-axis direction (direction along the streaks of entanglement generated by the hydroentangling treatment); and Sa an area of a sample region. Specifically, the center surface average roughness can be determined with a contacting needle type, three-dimensional surface roughness meter Model SE-3AK and a three-dimensional roughness analyzer Model SPA-11, both being made by Osaka Research Laboratory K.K., under conditions such as a cut-off value: 1.25 mm, $W_x$=10 mm, $W_y$=5 mm, and thus Sa=50 mm². X-axis direction data processing was carried out on 6667 samplings and Y-axis direction scanning was carried out in 10 lines.

Solution Absorbability

Initial electrolyte solution absorbability was evaluated by measuring an electrolyte solution-absorbing rate (height of elevation by suction in mm per minute). That is, the electrolyte solution-absorbing rate was determined by sampling 3 test pieces, 1.5 cm×18 cm, from each sample in the stream flow direction, subjecting the test pieces to a preliminary drying at 40±5° C., thereby making them below the official moisture content, then leaving the test pieces in a test room in the standard temperature and humidity states, weighing the test pieces at intervals of at least one hour to bring them into such a state that a difference in mass before the proceeding weighing and the successive weighing fails within 0.1% of the mass measured by the successive weighing (the state being called "moisture equilibrium state"), providing a horizontally extended red at a predetermined height over a caustic potash (KOH) solution having a specific gravity of 1.3 (20° C.) at 20±2° C. placed in a water tank, then fixing the test pieces each to the horizontally extended rod by pins so as to suspend the test pieces from the rod, while arranging the lower ends of the test pieces at the same height, lowering the rod so as to dip the test pieces into the solution only by 5 mm from the lower ends and measuring the height of elevation of the KOH solution through the test pieces by a capillary suction one minute after the dipping.

Water Absorbability Under Pressure (which may be hereinafter called: solution retainability")

A non-woven fabric for an alkali cell separator was subject to an increased pressure due to swelling of electrodes caused by charging and discharging, and thus the electrolyte solution in the non-woven fabric for an alkali cell separator gradually moved toward the positive pole side or negative pole side. In such a case, an amount of retained water (g/m²) under applied pressure was determined as a criterion for evaluation of an electrolyte solution retainability of a non-woven fabric for an alkali cell separator. That is, an amount of retained water under applied pressure was determined by sampling 3 test pieces, 10 cm×10 cm, from each sample, measuring the weight W (g) in a moisture equilibrium state, then dipping the test pieces into distilled water at 20±1° C. by spreading, leaving the test pieces standing for one minute, then taking them out of water, immediately enveloping the test pieces each with a filter paper (Advantec No.28), passing them through a roll press under a linear pressure of 50 kg/cm, measuring the weight $W_1$ (g) of the pressed test pieces and making calculation according to the following equation (2):

Amount of water retained under applied pressure (g/m²)=[($W_1$−W)/(0.1×0.1)]  (2)

Pinholes

Evaluation was made by visual inspection of corona discharge-treated, entangled webs, and pinhole non-generation was marked by o and pinhole generation by x.

Wound State

In the winding after the calender treatment, satisfactory smooth winding without wrinkle generation was marked by o, wrinkle generator by x, and relatively slight wrinkle generation by Δ.

TABLE 1

| | Example | | | | | | | |
|---|---|---|---|---|---|---|---|---|
| | 1 | 2 | 3 | 4 | 5 | 6 | 7 | 8 |
| Areal weight | 55.6 | 55.7 | 45.5 | 54.2 | 50.9 | 50.8 | 52.6 | 52.8 |
| Thickness | 180 | 178 | 142 | 175 | 174 | 149 | 174 | 175 |
| Pore diameter | | | | | | | | |
| 1 | 52.9 | 39.5 | 48.8 | 56.1 | 121 | 120 | 121 | 72.2 |
| 2 | 36.9 | 27.6 | 40.3 | 43.2 | 70.9 | 61.2 | 53.1 | 51.3 |
| Center surface roughness | | | | | | | | |
| Face side | 11.3 | 10.2 | 12.1 | 12.8 | 15.7 | 13.7 | 17.6 | 14.2 |
| Back side | 12.7 | 11.9 | 12.9 | 13.0 | 15.0 | 13.3 | 14.2 | 14.9 |
| Solution absorbability | 27.0 | 28.3 | 27.0 | 25.0 | 23.0 | 20.0 | 20.0 | 23.0 |
| Water absorbability under pressure | 32.0 | 32.0 | 21.0 | 32.0 | 30.0 | 25.0 | 30.0 | 29.0 |
| Pin holes | o | o | o | o | x | x | x | x |
| Wound state | o | o | o | o | x | x | Δ | Δ |

As shown in Examples Nos. 1 to 4 in the foregoing table 1, when hydroentangling treatment was carried out with columnar water stream jet nozzles each in such a shape that a injection outlet opening was broader than a water stream inlet opening, the nozzles being provided in an injector at least at the last stage, to make the center surface average roughness lower, the non-woven fabric was successfully obtained without any formation of pinholes during the course of corona discharge treatment, and without any deterioration of the wound state during the course of calender treatment. Furthermore, even at an areal weight of 40 g/m², the maximum pore diameter was successfully controlled to not more than 50 μm.

As shown in Examples Nos. 5 to 8, on the other hand, when the hydroentangling treatment was carried out with nozzles having a conventional nozzle shape, it was difficult to make the maximum pore diameter not more than 50 μm at a smaller areal weight, and problems of pinhole formation any deterioration of wound state were encountered. Furthermore, the solution retainability was somewhat lowered due to uneven pore diameter distribution, as compared with Examples Nos. 1 to 4.

As is evident from the foregoing, the non-woven fabrics for an alkali cell separator produced according to the present process has a particularly distinguished electrolyte solution retainability, particularly the solution retainability under pressure even at a low areal weight and also can prevent the active materials from transfer. Consequently, the present invention can provide a non-woven fabric for an alkali cell separator having both distinguished electrolyte solution absorbability and retainability. The present non-woven fabric for an alkali cell separator can be used suitably as a separator for an alkali secondary battery requiring high level characteristics such as a high capacity, a long life, a high reliability, etc.

The second aspect of the present invention will be described further in detail below, referring to Examples, to which the present invention is not restricted. In Examples, parts and % are all by weight.

EXAMPLE 9

A web having an areal weight of 52.8 g/m² and a width of 50 cm was formed from a blend of 30 parts of splittable composite fibers having a fineness of 3 denier [0.2 denier (3.9 μm) after fiber splitting] and a fiber length of 6 mm, comprising crystalline polypropylene having an MFR value of 40 and an ethylene/vinyl alcohol copolymer having an MFR value of 40 and a saponification degree of 99.6% with 70 parts of core-and-sheath type, heat-fusible composite fibers having a ratio of core to sheath of 50:50 by volume, a fineness of comprising polypropylene as a core member and an ethylene/vinyl alcohol copolymer as a sheath member by a wet web-forming process, using a cylinder paper machine.

Then, the web thus obtained was subjected to a corona discharge treatment on both sides thereof and finally to a calender treatment at the ordinary temperature to obtain a thickness of 150 μm, as measured by a micrometer, 6.3 mm in diameter, and cut to obtain non-woven fabrics for an alkali cell separator.

EXAMPLE 10

A non-woven fabric for an alkali cell separator was obtained in the same manner as in Example 9, except that 60 parts of the splittable composite fibers as used in Example 9 and 40 parts of the core-and-sheath type, heat-fusible fibers as used in Example 9 were only used in the blending proportion of polyolefin-based fibers.

EXAMPLE 11

A web having an areal weight of 42.9 g/m² and a width of 50 cm was formed from 80 parts of the splittable composite fibers as used in Example 9, 19 parts of polypropylene fibers having a fineness of 0.5 denier (8.8 μm) and a fiber length of 10 mm and one part of hot water-soluble polyvinyl alcohol fibers (VPW: made by Kuraray Co.) having a fineness of one denier and a fiber length of 3 mm by a wet web-forming process, using a cylinder paper machine.

Then, the web was transferred onto a perforated support of 100-mesh stainless steel wires and subjected to a hydroentangling treatment by a high pressure columnar water stream on both sides of the web, and then to a corona discharge treatment on both sides of the entangled non-woven fabric thus obtained.

Finally, the non-woven fabric was subjected to a calender treatment at the ordinary temperature to obtain a thickness of 123 μm, as measured by a micrometer, 6.3 mm in diameter, and cut to obtain non-woven fabrics for an alkali cell separator.

EXAMPLE 12

A non-woven fabric for an alkali cell separator was obtained in the same manner as in Example 11, except that the blending proportion of polyolefin-based fibers was charged, that is, 99 parts of the splittable composite fibers as used in Example 9 and one part of hot water-soluble polyvinyl alcohol fibers as used in Example 11 were only used.

EXAMPLE 13

A non-woven fabric for an alkali cell separator was obtained in the same manner as in Example 12, except that the areal weight was changed to 51.8 g/m² and the thickness to be obtained by the calender treatment was changed to 200 μm in Example 12.

EXAMPLE 14

A non-woven fabric for an alkali cell separator was obtained in the same manner as in Example 12, except that the areal weight was changed to 62.4 g/m² and the thickness to be obtained by the calender treatment was changed to 200 μm in Example 12.

EXAMPLE 15

A non-woven fabric for an alkali cell separator was obtained in the same manner as in Example 12, except that the areal weight was changed to 72.3 g/m² and the thickness to be obtained by the calender treatment was changed to 202 μm in Example 12.

EXAMPLE 16

A non-woven fabrics for an alkali cell separator was obtained in the same manner as in Example 4, except that the areal weight was changed to 79.1 g/m² and the thickness to be obtained by the calender treatment was changed to 201 μm in Example 12.

EXAMPLE 17

A non-woven fabric of polypropylene fibers having an areal weight of 65.3 g/m² was made by a melt-blow process and then the thickness was made 160 μm by heat pressing through hot rolls at 170° C.

Then, the non-woven fabric was subjected to a corona discharge treatment on both sides of the non-woven fabrics. Then, the non-woven fabric was impregnated with a non-ionic surfactant by a size press, and then dried in a hot air drier and finally subjected to a calender treatment at the ordinary temperature to obtain a thickness of 145 4m, as measured by a micrometer, 6.3 mm in diameter, and cut to obtain non-woven fabrics for an alkali cell separator.

EXAMPLE 18

A web having an areal weight of 57.6 g/m² and a width of 50 cm was formed from core-and-sheath type, heat-fusible composite fibers having a ratio of core to sheath of 50:50 by volume, a fineness of 2 denier and a fiber length of 5 mm, comprising polypropylene as a core member and an ethylene/vinyl alcohol copolymer as a sheath member by a wet web-forming process, using a cylinder paper machine.

Then, the web thus formed was subjected to a corona discharge treatment on both sides of the web and finally to a calender treatment at the ordinary temperature to obtain a thickness of 145 µm, as measured by a micrometer, 6.3 mm in diameter, and cut to obtain non-woven fabrics for an alkali cell separator.

EXAMPLE 19

A web having an areal weight of 65.7 g/m² was formed from core-and-sheath type, heat-fusible composite fibers having a ratio of core to sheath of 50:50 by volume, a fineness of 2 denier and a finer length of 51 mm, comprising polypropylene as a core member and an thylene/vinyl alcohol copolymer as a sheath member by a ross-layer process and then press-fused through hot calender rolls at 110° C. The web thus formed was subjected to a corona discharge treatment on both sides of the web.

Finally, the web was subjected to a calender treatment at the ordinary temperature to obtain a thickness of 146 µm, as measured by a micrometer, 6.3 mm in diameter, and cut to obtain non-woven fabrics for an alkali cell separator.

EXAMPLE 20

A non-woven fabric for an alkali cell separator was obtained in the same manner as in Example 13, except that no corona discharge treatment was carried out in Example 13.

The non-woven fabrics for an alkali cell separator obtained in Examples 9 to 20 were evaluated according to the following evaluation procedures. Results of evaluation are given in the following Tables 2 and 3.
Thickness
   Measured by the same procedure as in Example 1.
Pore Diameter Measurement
   For evaluation of pore diameter, pore diameter (µm) was measured by a Coulter porometer (made by PME Co., USA) according to ASTM F316-86.
   1) Standard deviation of pore diameter distribution (which will be hereinafter referred to as "standard deviation") was calculated from pore diameter distribution in a range for relative flow.
   2) Percentage of number of pores falling within a range of average pore diameter ±2 µm (which will be hereinafter referred to as "percentage" was determined from differential number between number of pores falling within a range of average pore diameter ±2 µm and total number of pores existing on the entire non-woven fabric for an alkali cell separator, and calculated in %.
Solution Absorbability
   Measured by the same procedure as in Example 1.
Water Absorbability Under Pressure
   Measured by the same procedure as in Example 1.

TABLE 2

| | | Example No. | | | | | |
|---|---|---|---|---|---|---|---|
| | | 9 | 10 | 11 | 12 | 13 | 14 |
| Areal weight | | 52.8 | 41.0 | 42.9 | 43.2 | 51.8 | 62.4 |
| Thickness | | 150 | 124 | 123 | 137 | 200 | 200 |
| Pore diameter measurement | Average pore diameter | 28.6 | 21.3 | 15.6 | 13.5 | 13.4 | 9.8 |
| | Standard deviation | 12.6 | 11.2 | 16.9 | 11.1 | 9.9 | 7.0 |
| | Percentage | 35.0 | 39.4 | 49.4 | 59.8 | 62.9 | 73.8 |
| Solution absorbability | | 38.5 | 45.5 | 24.0 | 27.0 | 20.0 | 18.7 |
| Water absorbability under pressure | | 6.0 | 17.2 | 28.7 | 21.0 | 28.0 | 30.0 |

TABLE 3

| | | Example No. | | | | | |
|---|---|---|---|---|---|---|---|
| | | 15 | 16 | 17 | 18 | 19 | 20 |
| Areal weight | | 72.3 | 79.1 | 65.3 | 57.6 | 67.5 | 51.8 |
| Thickness | | 202 | 201 | 145 | 145 | 146 | 198 |
| Pore diameter measurement | Average pore diameter | 8.1 | 7.0 | 6.2 | 19.8 | 22.9 | 13.2 |
| | Standard deviation | 5.5 | 4.7 | 3.6 | 22.1 | 23.4 | 9.8 |
| | Percentage | 79.9 | 84.1 | 51.3 | 33.8 | 32.0 | 63.4 |
| Solution absorbability | | 20.8 | 19.8 | 26.0 | 35.0 | 32.1 | 1.0 |
| Water absorbability under pressure | | 34.0 | 38.0 | 32.9 | 2.0 | 1.0 | 25.2 |

As shown in Examples 9 to 17 in the foregoing Tables 2 and 3, a distinguished solution retainability can be obtained, even if a high pressure is applied to the non-woven fabrics for an alkali cell separator, by making the standard deviation of pore diameter distribution not more than 20 µm and a percentage of number of pores falling within a range of an average pore diameter ±2 µm to total number of pores in the entire non-woven fabric not less than 35%.

It is also evident from Examples 9 to 17 that the smaller the standard deviation of pore diameter distribution is and the larger the percentage of number of pores falling within a range of an average pore diameter ±2 µm to total number of pores in the entire non-woven fabric is, the more improved the water absorbability under pressure is.

As shown in Examples 18 to 20 in Table 3, when the standard deviation of pore diameter distribution is more than 20 µm and the percentage of number of pores falling within a range of an average pore diameter ±2 µm to total number of pores in the entire non-woven fabric is less than 35%, on the other hand, the water absorbability under pressure is lowered, and a possibility for drying-out is increased when a high pressure is applied to the non-woven fabric for an alkali cell separator.

Example 13 of Table 2 and Example 20 of Table 3 show comparison between the application and the non-application of corona discharge treatment. In case of non-application of corona discharge treatment, the solution absorbability is extremely deteriorated and the water absorbability under pressure is somewhat lowered.

As is evident from the foregoing, the present non-woven fabrics for an alkali cell separator have a distinguished electrolyte solution retainability, particularly under pressure due to controlled standard deviation of pore diameter distribution and controlled percentage of number of pores falling within the definite range to make the electrolyte solution-retaining spaces finer and more uniform and increase number of the spaces. Furthermore, its electrolyte solution absorbability is much improved due to the corona discharge treatment of the web.

As a result, the present invention can provide a non-woven fabric for an alkali cell separator having distinguished electrolyte solution absorbability and retainability, and the present non-woven fabric for an alkali cell separator can be used suitably as a separator for an alkali secondary battery requiring high level characteristics such as a high capacity, a long life, a high reliability, etc.

Figure 6C:
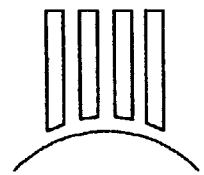

The third aspect of the present invention will be described further in detail below, referring to Examples, to which the present invention is not restricted. In Examples, parts and % are all by weight. Electrodes used in Examples are bar electrodes as shown in FIG. 5A, multi-electrodes as shown in FIG. 6C and multi-electrodes having a round tip end as shown in FIG. 6A, where electrodes each have the same area.

EXAMPLES 21 to 25

Non-woven fabrics were formed from 97 parts of splittable composite fibers having a fineness of 3 denier [0.2 denier (3.9 μm) after fiber splitting] and a fiber length of 6 mm, comprising crystalline polypro-pylene having an MFR value of 40 and an ethylene/vinyl alcohol copolymer having an ethylene content of 38% by mole, an MFR value of 40 and a saponification degree of 99.6% and 3 parts of hot water-soluble polyvinyl alcohol fibers (VPW 103: made by Kuraray Co.) having a fineness of one denier and a fiber length of 3 mm by a wet web-forming process, using a cylinder paper machine. Then, the non-woven fabrics were transferred onto a perforated support of 100-mesh stainless steel wires and subjected to a water steam entangling treatment by a high pressure columnar water stream. The entangled non-woven fabrics thus obtained were subjected to a corona discharge treatment under conditions as given in Table 4, and a calender treatment at the ordinary temperature, whereby the non-woven fabrics for an alkali cell separator having areal weights as shown in Table 4 were obtained.

EXAMPLE 26

A non-woven fabric having an areal weight of 58.1 g/m² was formed from 98 parts of heat-fusible, core-and-shell type composite fibers having a ratio of core to sheath of 50:50 by volume, a fineness of 1.5 denier and a fiber length of 10 mm, comprising polypropylene as a core member and an ethylene/vinyl alcohol copolymer as a sheath member and 2 parts of hot water-soluble polyvinyl alcohol fibers (VPW 103: made by Kurare Co.) having a fineness of one denier and a fiber length of 3 mm by a wet web-forming process, using a cylinder paper machine. The non-woven fabric was subjected to a corona discharge treatment, as shown in Table 4, on the face and back sides of the non-woven fabric and a calender treatment at the ordinary temperature, whereby the non-woven fabric for an alkali cell separator was obtained.

EXAMPLES 27 to 29

Non-woven fabrics having an areal weight of 57.9 g/m² were formed from 100 parts of core-and-sheath type, heat-fusible composite fibers having a ratio of core to sheath of 50:50 by volume, a fineness of 1.5 denier and a fiber length of 10 mm, comprising polypropylene as a core member and a resin having a molecular weight of 1,000,000, comprising cross-linked polyethylene oxide and low density polyethylene in solution in a ratio of 20:80 as a sheath member by a wet web-forming process, using a cylinder paper machine. The non-woven fabrics were subjected to a corona discharge treatment, as shown in Table 4, on the face and back sides of the non-woven fabrics and a calender treatment at the ordinary temperature, whereby non-woven fabrics for an alkali cell separator were obtained.

EXAMPLE 30

A non-woven fabric was formed from 70 parts of splittable composite fibers having a fineness of 3 denier [0.2 denier (3.9 μm) after fiber spitting] and a fiber length of 6 mm, comprising crystalline polypropylene having an MFR value of 40 and an ethylene/vinyl alcohol copolymer having an ethylene content of 38% by mole, an MFR value of 40 and a saponification value of 99.6%, 3 parts of hot water-soluble polyvinyl alcohol fibers (VPW 103: made by Kuraray Co.) having a fineness of one denier and a fiber length of 3 mm and 27 parts of core-and-sheath type, heat-fusible composite fibers having a ratio of core to sheath of 50:50 by volume, comprising polypropylene as a core member and a resin having a molecular weight of 1,000,000, comprising cross-linked polyethylene oxide and low density polyethylene in solution in a ratio of 20:80 as a sheath member by a wet web-forming process, using a cylinder paper machine. Then, the non-woven fabric was transferred onto a perforated support of 100-mesh stainless steel wires and subjected to a hydroentangling treatment by a high pressure columnar water stream. The entangled non-woven fabric thus obtained was subjected to a corona discharge under conditions shown in Table 5 and a calender treatment at the ordinary temperature, whereby a non-woven fabric for an alkali cell separator was obtained.

EXAMPLES 31 to 33

The entangled non-woven fabrics obtained in Example 2 were subjected to a corona discharge treatment under conditions shown in Table 4 and a calender treatment at the ordinary temperature, whereby a non-woven fabrics for an alkali cell separator were obtained. No corona discharge treatment was carried out in Example 31.

EXAMPLES 34 to 36

In place of the corona discharge treatment, the entangled non-woven fabrics obtained in Example 21 were subjected to a plasma treatment on the face side and the back side of the non-woven fabrics by setting the non-woven fabric at a position 10 cm distant from the electrode and in parallel to the electrode in a plasma treating apparatus (pressure-reduced vessel), evacuating the inside of the plasma treating apparatus down to $10^{-5}$ Torr, adjusting the pressure to 0.01 Torr by supplying an oxygen gas thereto at a flow rate of 10 cc/min. and conducting the plasma treatment at a radio-frequency of 13.56 MHz, and then to a calender treatment at the ordinary temperature, whereby non-woven fabrics for an alkali cell separator were obtained. In these Examples, the O/C ratio was charged by changing the plasma irradiation time.

EXAMPLE 37

A non-woven fabric was formed from 97 parts of polypropylene fibers having a fineness of 0.5 denier and a fiber length of 10 mm and 3 parts of hot water-soluble polyvinyl alcohol fibers (VPW 103: made by Kuraray Co.) having a fineness of one denier and a fiber length of 3 mm by a wet web-forming process, using a cylinder paper machine. Then, the non-woven fabric was transferred onto a perforated support of 100-mesh stainless steel wires and subjected to a hydroentangling treatment by a high pressure columnar water stream. The entangled non-woven fabric thus formed was subjected to a corona discharge treatment under conditions shown in Table 4 and a calender treatment at the ordinary temperature, whereby a non-woven fabric for an alkali cell separator was obtained.

The non-woven fabrics for an alkali cell separator obtained in Examples 21 to 37 were evaluated according to the following evaluation methods, and results of evaluation are shown in the following Table 4. Abbreviations given in the column "discharge treatment" in Table have the following meanings.

CB: corona discharge treatment, using bar electrodes (FIG. 5A)

CC: corona discharge treatment, using multi-electrodes (FIG. 6C)

CM: corona discharge treatment, using round multi-electrodes (FIG. 6A)

PZ: plasma discharge treatment

Thickness

Measured by the same procedure as in Example 1.

O/C Ratio

O/C ratio of non-woven fabrics for an alkali cell separator was determined for a ratio of existing oxygen atoms (O) to existing carbon atoms (C) (O/C ratio) as peak areas by conducting elemental analysis of non-woven fabric surface by an electron spectro-chemical analyzer made by V.G. Scientific, using a magnesium K-α beam as an X ray source. The measurements were obtained at n=3 and shown as their average. An O/C ratio at the intermediate position in the thickness direction of the non-woven fabric was determined on samples of non-woven fabrics from whose surfaces cellophane tape-sticked fibers have been removed in advance. The O/C ratio on the non-woven fabric surface and the O/C ratio at the intermediate position in the thickness direction of the non-woven fabric (position by about 90 μm inward from the on-woven fabric surface) thus determined are shown in columns "surface" and "intermediate", respectively.

Solution Absorbability

Measured by the same procedure as in Example 1.

Water Absorption Under Pressure

Measured by the same procedure as in Example 1.

Chang'e with Time

Changes with time in the solution absorbability of non-woven fabrics for an alkali cell separator, whose affinity to an electrolyte solution has been improved, were evaluated by measuring the solution absorbability 3 months after the non-woven fabric were left, standing in an environmental test room at a temperature of 20° C. and a humidity of 65%. Solution absorbabilities lowered to less than 40% of the solution absorbability before being left standing were designated by X, those lowered to 40–60% by Δ, those lowered to 61–80% by o and those maintained at 81% or more by ⊙. Practically applicable non-woven fabrics for an alkali cell separator are at least at the Δ level.

Perforations

Corona discharged non-woven fabrics were at first visually evaluated by holding the non-woven fabrics to a fluorescent lamp, and then microscopically examined. No generation of perforations (pinholes) having a diameter of not less than 100 μm was designated by o and generation by x.

TABLE 4

| | | Areal weight | Thickness | O/C ratio | | Discharge treatment type | Number of electrodes | Discharge intensity | Solution absorbability | Water absorbability under pressure | Changes with time | Perforations |
|---|---|---|---|---|---|---|---|---|---|---|---|---|
| | | | | Surface | Intermediate | | | | | | | |
| Example No. | 21 | 54.5 | 181 | 0.56 | 0.45 | CB | 05 | 6.5 | 26.5 | 27.0 | Δ | o |
| | 22 | 55.1 | 180 | 0.89 | 0.61 | CC | 04 | 15.4 | 33.0 | 29.0 | o | o |
| | 23 | 55.1 | 180 | 0.88 | 0.57 | CB | 20 | 6.5 | 32.5 | 28.0 | o | o |
| | 24 | 55.3 | 180 | 1.28 | 0.90 | CC | 05 | 13.4 | 35.0 | 31.2 | o | o |
| | 25 | 55.2 | 180 | 1.24 | 0.84 | CB | 25 | 6.5 | 34.8 | 31.2 | o | o |
| | 26 | 58.1 | 180 | 0.87 | 0.51 | CB | 20 | 6.5 | 30.0 | 10.0 | o | o |
| | 27 | 57.9 | 181 | 0.75 | 0.47 | CB | 20 | 6.5 | 35.0 | 10.8 | Δ | o |
| | 28 | 57.9 | 181 | 1.23 | 0.80 | CM | 04 | 19.8 | 52.0 | 15.0 | ⊙ | o |
| | 29 | 57.9 | 181 | 1.81 | 1.17 | CM | 05 | 19.8 | 53.0 | 14.5 | ⊙ | o |
| | 30 | 56.8 | 180 | 0.53 | 0.45 | CB | 05 | 6.5 | 27.2 | 25.0 | Δ | o |
| | 31 | 55.1 | 180 | 0.41 | 0.40 | — | — | — | 1.0 | 22.0 | — | o |
| | 32 | 55.2 | 181 | 0.86 | 0.57 | CC | 04 | 16.0 | 32.5 | 28.0 | o | x |
| | 33 | 55.3 | 180 | 0.86 | 0.56 | CB | 20 | 7.5 | 31.0 | 28.0 | o | x |
| | 34 | 55.3 | 180 | 0.62 | 0.41 | PZ | — | — | 29.0 | 27.0 | x | o |
| | 35 | 55.3 | 180 | 0.83 | 0.43 | PZ | — | — | 30.5 | 29.0 | x | o |
| | 36 | 55.2 | 180 | 1.21 | 0.49 | PZ | — | — | 33.0 | 30.0 | x | o |
| | 37 | 56.3 | 180 | 0.78 | 0.48 | CM | 04 | 13.4 | 12.5 | 16.5 | x | o |

As is evident from Examples 21 to 30, non-woven fabrics comprising polyolefin-based fibers partially containing an ethylene/vinyl alcohol copolymer or cross-linked polyethylene oxide and having an O/C ratio of 0.50 to 1.85 on the non-woven fabric surface and an O/C ratio of 0.45 to 1.30 at the intermediate position in the thickness direction of non-woven fabric resulting from the corona discharge treatment had a less decrease in the solution absorbability with time during the storage period before use and much distinguished electrolyte solution absorbability and retainability as required for the non-woven fabrics for an alkali cell separator.

Examples 21 to 25 show that, though the same non-woven fabrics for an alkali cell separator were used, a good solution retainability could be obtained by changing the type of electrodes, discharge intensity and number of electrodes, that is, the O/C ratio.

Furthermore, Examples 27 to 29 show that, though the same non-woven fabrics for an alkali cell separator were used, Example 27 using a large number of bar electrodes had more distinguished in the efficiency and characteristics than Examples using a few round multi-electrodes.

On the other hand, the non-woven fabric for an alkali cell separator of Example 31, which was not subjected to the discharge treatment, was outside the rough of O/C ratio of the present invention and had poor characteristics.

In the non-woven fabrics for an alkali cell separators of Examples 32 and 33, the discharge intensity of multi-electrodes was increased over the limit discharge intensity, i.e. 16.0 w/cm$^2$, in Example 32, and that of bar electrodes over to 7.5 w/cm$^2$ in Example 33. Perforations were generated, and thus these fabrics had practical problems.

Non-woven fabrics for an alkali cell separator of Examples 34 to 36 satisfied the O/C ratio but had poor evaluation as to the changes with time, though subjected to the plasma discharge treatment.

The non-woven fabric for an alkali cell separator of Example 37 was based on polypropylene fibers as polyolefin-based fibers, and satisfied the required O/C ratio, but had poor characteristics such as solution absorbability and changes with time.

EXAMPLES 38 to 40

Non-woven fabrics were formed from 95 parts of splittable composite fibers having a fineness of 3 denier [0.2 denier (3.9 μm) after fiber splitting] and a fiber length of 6 mm, comprising crystalline polypropylene having an MFR value of 40 and an ethylene/vinyl alcohol copolymer having an ethylene content of 38% by mode, an MFR value of 40 and a saponification degree of 99.6% by a wet web-forming process, using a cylinder paper machine. Successively, the non-woven fabrics were transferred onto a perforated support of 100-mesh stainless steel wires and subjected to a hydroentangling treatment by a high pressure columnar water stream. The entangled non-woven fabrics thus obtained were subjected to a corona discharge treatment under conditions shown in Table 5 and a calender treatment at the ordinary temperature, whereby non-woven fabrics for an alkali cell separator having areal weights shown in Table 5 were obtained.

EXAMPLE 41

A non-woven fabric having an areal weight of 58.1 g/m$^2$ was formed from 100 parts of heat-fusible, core-and-sheath type composite fibers having a ratio of core to sheath of 50:50 by volume, a fineness of 1.5 denier and a fiber length of 10 mm, comprising polypropylene as a core member and an ethylene/vinyl alcohol copolymer as a sheath member by a wet web-forming process, using a cylinder paper machine. The non-woven fabric was subjected to a corona discharge treatment on the face side and back side of the non-woven fabric and a calender treatment at the ordinary temperature, whereby a non-woven fabric for an alkali cell separator was obtained.

EXAMPLE 42

A non-woven fabric was formed from 70 parts of splittable composite fibers having a fineness of 3 denier [0.2 denier (3.9 μm) after fiber splitting] and a fiber length of 6 mm, comprising crystalline polypropylene having an MFR value of 40 and an ethylene/vinyl alcohol copolymer having an ethylene content of 38% by mole, an MFR value of 40 and a saponification degree of 99.6%, 5 parts of hot water-soluble polyvinyl alcohol fibers having a fineness of one denier and a fiber length of 3 mm and 25 parts of core-and-sheath type, heat-fusible composite fibers having a ratio of core to sheath of 50:50 by volume, a fineness of 1.5 denier and a fiber length of 10 mm, comprising polypropylene as a core member and a resin having a molecular weight of 1,000,000, comprising cross-linked polyethylene oxide and low density polyethylene in solution in a ratio of 20:80 as a sheath member by a wet web-forming process, using a cylinder paper machine. Successively, the non-woven fabric was transferred onto a perforated support of 100-mesh stainless steel wires and subjected to a hydroentangling treatment by a high pressure columnar water stream. The entangled non-woven fabric thus obtained was subjected to a corona discharge treatment under conditions shown in Table 5 and a calender treatment at the ordinary temperature, whereby a non-woven fabric for an alkali cell separator was obtained.

The non-woven fabrics obtained in Examples 38 to 42 were evaluated according to the same evaluation procedures as mentioned above, and results of evaluation are shown in the following Table 5. The following evaluation item, i.e. fiber state, was supplemented.

Fiber State

Fiber surfaces were inspected by electron microscope pictures and generation of fine creases was designated by o and no generation by x.

TABLE 5

| Example No. | Areal weight | Thickness | O/C ratio Surface | O/C ratio Intermediate | Discharge treatment type | Number of electrodes | Discharge intensity | Creases | Solution absorbability | Water absorbability under pressure | Changes with time | Perforations |
|---|---|---|---|---|---|---|---|---|---|---|---|---|
| 38 | 55.1 | 180 | 0.88 | 0.63 | CM | 04 | 13.4 | o | 33.0 | 29.0 | ◎ | o |
| 39 | 55.7 | 178 | 1.20 | 0.88 | CM | 05 | 13.4 | o | 35.0 | 31.2 | ◎ | o |
| 40 | 55.2 | 180 | 1.35 | 0.97 | CM | 06 | 13.4 | o | 34.0 | 31.2 | ◎ | o |
| 41 | 58.1 | 180 | 1.28 | 0.77 | CM | 05 | 13.4 | o | 50.0 | 13.0 | ◎ | o |
| 42 | 56.8 | 180 | 0.65 | 0.54 | CM | 01 | 13.5 | o | 35.5 | 29.0 | ◎ | o |

Figure 7:
FIG. 7 is an electron microscope picture of a non-woven fabric for an alkali cell separator given in Example 39.

The non-woven fabrics for an alkali cell separator of Examples 38 to 40 were non-woven fabrics for an alkali cell separator comprising splittable composite fibers comprising polypropylene and an ethylene/vinyl alcohol copolymer containing finely creased polyolefin-based fibers and having a large number of fine creases formed on the very fine fiber surfaces of the ethylene/vinyl alcohol copolymer. All the non-woven fabrics for an alkali cell separator of Examples 38 to 40 were similar to one another, and an electron microscope picture of the non-woven fabric for an alkali cell separator of Example 39 is shown in FIG. 7. The electrolyte solution absorbability and retainability were satisfactory without increasing the O/C ratio both on the non-woven fabric surface and at the intermediate position.

Figure 8:
FIG. 8 is an electron microscope picture of a non-woven fabric for an alkali cell separator given in Example 41.

The non-woven fabric for an alkali cell separator of Example 41 was an non-woven fabric for an alkali cell separator comprising core-and-sheath type, composite fibers comprising polypropylene as a core member and an ethylene/vinyl alcohol copolymer as a sheath member and had considerably enhanced electrolyte solution absorbability and retainability with less decrease with time in the affinity to an electrolyte solution due to formation of fine creases on the sheath member of ethylene/vinyl alcohol copolymer. Electron microscope picture of the non-woven fabric for an alkali cell separator of Example 41 is shown in FIG. 8.

The non-woven fabric for an alkali cell separator of Example 42 was a non-woven fabric for an alkali cell separator comprising splittable composite fibers and core-and-sheath type composite fibers at the same time and had considerably enhanced electrolyte solution absorbability and retainability with less decrease with time in the affinity to an electrolyte solution due to formation of fine creases on the ethylene/vinyl alcohol copolymer member in the same manner as above.

EXAMPLES 43 to 45

Now-woven fabrics were formed from 96 parts of splittable composite fibers having a fineness of 3 denier [0.2 denier (3.9 µm) after fiber splitting] and a fiber length of 6 mm, comprising crystalline polypropylene having an MFR value of 40 and an ethylene/vinyl alcohol copolymer having an ethylene content of 38% by mole, an MFR value of 40 and a saponification degree of 99.6% and 4 parts of hot water-soluble polyvinyl alcohol fibers (VPW 103: made by Kuraray Co.) having a fineness of one denier and a fiber length of 3 mm by a wet web-forming process, using a cylinder paper machine. Successively, the non-woven fabrics were transferred onto a perforated support of 100-mesh stainless steel wires and subjected to a hydroentangling treatment by a high pressure columnar water stream. The entangled non-woven fabrics thus obtained were subjected to a corona discharge treatment under conditions shown in Table 1 and a calender treatment at the ordinary temperature, whereby non-woven fabrics for an alkali cell separator having areal weights shown in table 6 were obtained.

EXAMPLES 46 and 47

Now-woven fabrics having an areal weight of 58.1 g/m² were formed from 97 parts of heat-fusible, core-and-sheath type composite fibers having a ratio of core to sheath of 50:50 by volume, a fineness of 1.5 denier and a fiber length of 10 mm, comprising polypropylene as a core member and an ethylene/vinyl alcohol copolymer as a sheath member and 3 parts of hot water-soluble polyvinyl alcohol fibers (VPW 103: made by Kurare Co.) having a fineness of one denier and a fiber length of 3 mm by a wet web-forming process, using a cylinder paper machine. The non-woven fabrics were subjected to a corona discharge treatment on the face side and the back side of the non-woven fabrics shown in Table 6 and a calender treatment at the ordinary temperature, whereby non-woven fabrics for an alkali cell separator were obtained.

EXAMPLES 48 and 49

Now-woven fabrics having an areal weight of 57.9 g/m² were formed from 98 parts of core-and-sheath type, heat-fusible composite fibers having a ratio of core to sheath of 50:50 by volume, a fineness of 1.5 denier and a fiber length of 10 mm, comprising polypropylene as a core member and a resin having a molecular weight of 1,000,000, comprising cross-linked polyethylene oxide and low density polyethylene in solution in a ratio of 20:80, and 2 parts of hot water-soluble polyvinyl alcohol fibers (VPW/03: made by Kuraray Co.) having a fineness of one denier and a fiber length of 3 mm by a wet web-forming process, using a cylinder paper machine. The non-woven fabrics were subjected to a corona discharge treatment on the face side and back side of the non-woven fabric shown in Table 6 and a calender treatment at the ordinary temperature, whereby non-woven fabrics for an alkali cell separator were obtained.

EXAMPLE 50

A non-woven fabric having an areal weight of 57.5 g/m² and a width of 50 cm was formed from 50 parts of heat-fusible, core-and-sheath type composite fibers having a ratio of core to sheath of 50:50 by volume, a fineness of 1.5 denier and a fiber length of 10 mm, comprising polypropylene as a core member and an ethylene/vinyl alcohol copolymer as a sheath member and 50 parts of polypropylene fibers having a fineness of 0.5 denier and a fiber length of 5 mm by a wet web-forming process, using a cylinder paper machine. The non-woven fabric was subjected to a corona discharge treatment on the face side and back side of the non-woven fabric shown in Table 6 and a calender treatment at the ordinary temperature, whereby a non-woven fabric for an alkali cell separator was obtained.

EXAMPLE 51

A non-woven fabric was formed from 70 parts of splittable composite fibers having a fineness of 3 denier [0.2 denier (3.9 µm) after fiber splitting] and a fiber length of 6 mm, comprising crystalline polypropylene having an MFR value of 40 and an ethylene/vinyl alcohol copolymer having an ethylene content of 36% by mole, an MFR value of 40 and a saponification degree of 99.6%, 2 parts of hot water-soluble polyvinyl alcohol (VPW 103: made by Kuraray Co.) having a fineness of one denier and a fiber length of 3 mm, and 28 parts of core-and-sheath type, heat-fusible composite fibers having a ratio of core to sheath of 50:50 by volume, a fineness of 1.5 denier and a fiber length of 10 mm, comprising polypropylene as a core member and a resin having a molecular weight of 1,000,000, comprising cross-linked polyethylene oxide and low density polyethylene in solution in a ratio of 20:80 by a wet web-forming process, using a cylinder paper machine. Successively, the non-woven fabric was transferred onto a perforated support of 100-mesh stainless steel wires and subjected to a hydroentangling treatment by a high pressure columnar water stream. The entangled non-woven fabric thus obtained was subjected to a corona discharge treatment under conditions shown in Table 6 and a calender treatment at the ordinary temperature, whereby a non-woven fabric for an alkali cell separator was obtained.

EXAMPLE 52

The entangled non-woven fabric obtained in Example 21 was subjected to a corona discharge treatment under conditions shown in Table 6 and a calender treatment at the ordinary temperature, whereby a non-woven fabric for an alkali cell separator was obtained.

The non-woven fabrics for an alkali cell separator obtained in Examples 43 to 52 were evaluated according to the same procedures as above and results of evaluation are shown in the following Table 6.

TABLE 6

| | | Areal weight | Thickness | O/C ratio Surface | O/C ratio Intermediate | Discharge treatment type | Number of electrodes | Discharge intensity | Solution absorbability | Water absorbability under pressure | Changes with time | Perforations |
|---|---|---|---|---|---|---|---|---|---|---|---|---|
| Example No. | 43 | 54.5 | 182 | 0.58 | 0.45 | CM | 01 | 13.4 | 27.0 | 27.0 | ○ | ○ |
| | 44 | 55.1 | 181 | 0.83 | 0.56 | CM | 08 | 6.7 | 32.0 | 27.8 | ○ | ○ |
| | 45 | 55.2 | 180 | 0.91 | 0.69 | CM | 03 | 19.8 | 33.5 | 30.0 | ⊙ | ○ |
| | 46 | 58.1 | 180 | 0.86 | 0.54 | CM | 04 | 13.4 | 32.0 | 10.0 | ○ | ○ |
| | 47 | 58.1 | 180 | 1.52 | 0.91 | CM | 05 | 19.8 | 48.0 | 13.0 | ⊙ | ○ |
| | 48 | 57.9 | 181 | 0.77 | 0.49 | CM | 04 | 13.1 | 36.0 | 11.4 | ○ | ○ |
| | 49 | 57.9 | 181 | 1.79 | 1.17 | CM | 05 | 19.8 | 55.0 | 15.0 | ⊙ | ○ |
| | 50 | 57.5 | 180 | 0.87 | 0.52 | CM | 04 | 19.8 | 27.5 | 17.6 | ○ | ○ |
| | 51 | 56.8 | 180 | 0.79 | 0.59 | CM | 02 | 13.5 | 38.5 | 29.5 | ⊙ | ○ |
| | 52 | 55.2 | 181 | 0.85 | 0.59 | CM | 04 | 21.0 | 32.0 | 28.2 | ○ | x |

The non-woven fabrics for an alkali cell separator of Examples 43 to 51 correspond to cases of application of corona discharge treatment, using corona electrodes having a round tip end, where the discharge intensity could be enhanced without generation of perforations (pinholes) due to use of the specific electrodes and the number of electrodes could be consequently reduced, and thus non-woven fabrics for an alkali cell separator could be efficiently produced.

The following Examples are examples satisfying at least two of requirements according to the first, second and third aspects of the present invention.

EXAMPLE 53

A web was formed from 97 parts of splittable composite fibers and 3 parts of lot water-soluble polyvinyl alcohol fibers (VPW 103: made by Kuraray Co.) by a wet web-forming process, using a cylinder paper machine in the same manner as in Example 1.

Then, the web was transferred onto a perforated support of 100-mesh stainless steel wires and subjected to a hydroentangling treatment by a high pressure columnar water stream at a treating rate of 10 m/min.

2 injectors were used, each injector being provided with columnar water stream jet nozzles in a shape shown in FIG. 3A having a nozzle pitch of 0.6 mm and a nozzle diameter of 120 μm. At first, the web was subjected to an entanglement on the face side and then on the back side under a water pressure of 130 kg/cm$^2$. The entangled web thus obtained was subjected to a corona discharge treatment on both sides and finally to a calender treatment at the ordinary temperature to obtain a thickness of 181 μm, as measured by a micrometer, 6.3 mm in diameter, and cut to obtain non-woven fabrics for an alkali cell separator.

EXAMPLE 54

A web having an areal weight of 54.8 g/m$^2$ and a width of 50 cm was formed from a blend comprising 40 parts of splittable composite fibers and 60 parts of core-and-sheath type, heat-fusible composite fibers by a wet web-forming process, using a cylinder paper machine in the same manner as in Example 9.

Then, the web thus obtained was subjected to a corona discharge treatment on both sides and finally to a calender treatment at the ordinary temperature to obtain a thickness of 151 μm, as measured by a micrometer, 6.3 mm in diameter, and cut to obtain no-woven fabrics for an alkali cell separator.

Results of evaluation are shown in Table 7.

TABLE 7

| | | Example 53 | Example 54 |
|---|---|---|---|
| Areal weight | | 55.2 | 54.8 |
| Thickness | | 181 | 151 |
| Pore diameter measurement | Average pore diameter | 11.8 | 26.2 |
| | Standard deviation | 8.1 | 12.1 |
| | Percentage | 69.3 | 37.0 |
| Solution absorbability | | 25.0 | 37.1 |
| Water absorbability under pressure | | 32.0 | 8.0 |
| Pore diameter | 1 | 49.5 | 68.2 |
| | 2 | 32.4 | 45.8 |
| Center surface roughness | Face | 10.3 | 9.1 |
| | Back side | 11.4 | 9.4 |
| Pinholes | | ○ | ○ |
| Wound state | | ○ | ○ |

EXAMPLE 55

A web was formed from 96 parts of splittable composite fibers having a fineness of 3 denier [0.2 denier (3.9 μm) after fiber splitting] and a fiber length of 6 mm, comprising crystalline polypropylene having an MFR value of 40 and an ethylene/vinyl alcohol copolymer having an ethylene content of 38% by mole, an MFR value of 40 and a saponification degree of 99.6% and 4 parts of hot water-soluble polyvinyl alcohol fibers (VPW 103: made by Kuraray Co.) having a fineness of one denier and a fiber length of 3 mm by a wet web-forming process, using a cylinder paper machine.

Then, the web was transferred onto a perforated support of 100-mesh stainless steel wires and subjected to a hydroentangling treatment by a high pressure columnar water stream at a treating rate of 10 m/min.

Two injectors were used, each injector being provided with columnar water stream jet nozzles in a shape shown in FIG. 3A having a nozzle pitch of 0.6 mm and a nozzle diameter of 120 μm therein. At first, the web was subjected to an entanglement on the face side and then on the back side under a water pressure of 130 kg/cm$^2$. The entangled web thus obtained was subjected to a corona discharge treatment on both sides under conditions shown in Table 8 and finally to a calender treatment at the ordinary temperature to obtain a thickness of 181 μm, as measured by a micrometer, 6.3 mm in diameter, and cut to obtain non-woven fabrics for an alkali cell separator.

Results of evaluation are shown in Tables 8 and 9.

TABLE 8

| Areal weight | Thick-ness | O/C rate Sur-face | O/C rate Inter-mediate | Dis-charge treatment type | Number of elec-trodes | Dis-charge inten-sity | Solution absorba-bility | Water absorbability under pressure | Changes with time | Perfo-rations |
|---|---|---|---|---|---|---|---|---|---|---|
| 55.2 | 181 | 0.87 | 0.65 | CC | 04 | 15.4 | 29.0 | 30.0 | ○ | ○ |

TABLE 9

| Pore diameter | 1 | 48.5 |
|---|---|---|
|  | 2 | 31.4 |
| Center surface roughness | Face side | 10.5 |
|  | Back side | 11.1 |
| Pinholes |  | ○ |
| Wound state |  | ○ |

EXAMPLE 56

A web was formed from 95 parts of splittable composite fibers having a fineness of 3 denier [0.2 denier (3.9 μm) after fiber splitting] and a fiber length of 6 mm, comprising crystalline polypropylene having an MFR value of 40 and an ethylene/vinyl alcohol polymer having an ethylene content of 38% by mole, an MFR value of 40 and a saponification degree of 99.65 and parts of hot water-soluble polyvinyl alcohol fibers (VPW 103: made by Kuraray Co.) having a fineness of one denier and a fiber length of 3 mm by a wet web-forming process, using a cylinder paper machine.

Then, the web was transferred onto a perforated support of 100-mesh stainless steel wires and subjected to a hydroentangling treatment by a high pressure columnar water stream.

The entangled web thus obtained was subjected to a corona discharge treatment on both sides under conditions shown in Table 10, and finally to a calender treatment at the ordinary temperature to obtain a thickness of 180 μm, as measured by a micrometer, 6.3 cm in diameter, and cut to obtain non-woven fabrics for an alkali cell separator.

Results of evaluation are shown in Table 10.

As a result of pore diameter measurement (see Examples 9 to 20), it was found that the average pore diameter was 12.5 μm, the standard deviation 8.3 and the percentage 67.3%.

EXAMPLE 57

A now-woven fabric was formed from 95 parts of split-table composite fibers having a fineness of 3 denier [0.2 denier (3.9 μm) after fiber splitting] and a fiber length of 6 mm, comprising crystalline polypropylene having an MFR value of 40 and an ethylene/vinyl alcohol copolymer having an ethylene content of 38% by mole, an MFR value of 40 and a saponification value of 99.6%, 3 parts of hot water-soluble polyvinyl alcohol fibers (VPW 103: made by Kuraray Co.) having a fineness of one denier and a fiber length of 3 mm and 5 parts of heat-fusible, core-and sheath type composite fibers having a ratio of core to sheath of 50:50 by volume, a fineness of 1.0 denier and a fiber length of 10 mm, comprising polypropylene as a core member and an ethylene/vinyl alcohol copolymer as a sheath member by a wet web-forming process, using a cylinder paper machine. Successively, the non-woven fabric was transferred onto a perforated support of 100-mesh stainless steel wires and subjected to a hydroentangling treatment by a high pressure columnar water stream. The entangled non-woven fabric thus obtained was subjected to a corona discharge treatment under conditions shown in Table 11 and a calender treatment at the ordinary temperature, whereby a non-woven fabric for an alkali cell separator having an areal weight shown in Table 11 was obtained.

Results of evaluation are shown in Tables 11 and 12.

TABLE 10

| Areal weight | Thick-ness | O/C rate Sur-face | O/C rate Inter-mediate | Dis-charge treatment type | Number of elec-trodes | Dis-charge inten-sity | Solution absorba-bility | Water absorbability under pressure | Changes with time | Perfo-rations |
|---|---|---|---|---|---|---|---|---|---|---|
| 54.5 | 180 | 0.89 | 0.66 | CC | 04 | 15.4 | 29.0 | 30.0 | ○ | ○ |

TABLE 11

| Areal weight | Thickness | O/C rate Surface | O/C rate Intermediate | Discharge treatment type | Number of electrodes | Discharge intensity | Creases | Solution absorbability | Water absorbability under pressure | Changes with time | Perforations |
|---|---|---|---|---|---|---|---|---|---|---|---|
| 57.1 | 180 | 0.91 | 0.66 | CM | 04 | 13.4 | ○ | 34.0 | 29.0 | ◉ | ○ |

TABLE 12

| Pore diameter | Before 1 | 50.1 |
|---|---|---|
|  | After 2 | 30.4 |
| Center surface roughness | Face side | 10.1 |
|  | Back side | 12.9 |
| Pinholes |  | ○ |
| Wound state |  | ○ |

EXAMPLE 58

A non-woven fabric was formed from 95 parts of splittable composite fibers having a fineness of 3 denier [0.2 denier (3.9 μm) after fiber splitting] and a fiber length of 6 mm, comprising crystalline polypropylene having an MFR value of 40 and an ethylene/vinyl alcohol copolymer having an ethylene content of 38% by mole, an MFR value of 40 and a saponification degree of 99.6%, 3 parts of hot water-soluble polyvinyl alcohol fibers (VPW 103: made by Kuraray Co.) having a fineness of one denier and a fiber length of 3 mm and 7 parts of heat-fusible, core-and-sheath type composite fibers having a ratio of core to sheath of 50:50 by volume, a fineness of 1.0 denier and a fiber length of 10 mm, comprising polypropylene as a core member and an ethylene/vinyl alcohol copolymer as a sheath member by a wet web-forming process, using a cylinder paper machine. Successively, the non-woven fabric was transferred onto a perforated support of 100-mesh stainless steel wires and subjected to a hydroentangling treatment by a high pressure columnar water stream. The entangled non-woven fabric thus obtained was subjected to a corona discharge treatment under conditions shown in Table 13 and a calender treatment at the ordinary temperature, whereby an non-woven fabric for an alkali cell separator having an areal weight shown in Table 13 was obtained.

Results of evaluation are shown in Table 13.

As a result of pore diameter measurements (see Examples 9 to 20), it was found that the average pore diameter was 14.5 μm, the standard deviation 10.3 and the percentage 63.0%.

The following Examples correspond to cases of conducting the corona discharge treatment after the calender treatment.

EXAMPLE 59

A non-woven fabric for an alkali cell separator was obtained in the same manner as in Example 1, except that the corona discharge treatment was carried out not before, but after the calender treatment.

Results of evaluation are shown in Table 14.

TABLE 14

| Areal weight |  | 55.4 |
|---|---|---|
| Thickness |  | 179 |
| Pore diameter | 1 | 53.1 |
|  | 2 | 35.2 |
| Center surface roughness | Face side | 11.0 |
|  | Back side | 12.1 |
| Solution absorbability |  | 25.5 |
| Water absorbability under pressure |  | 30.5 |
| Pinholes |  | ○ |
| Wound state |  | ○ |

EXAMPLE 60

A non-woven fabric for an alkali cell separator was obtained in the same manner as in Example 22, except that the corona discharge treatment was carried out not before, but after the calender treatment.

Results of evaluation are shown in Table 15.

TABLE 13

| Areal weight | Thickness | O/C rate Surface | O/C rate Intermediate | Discharge treatment type | Number of electrodes | Discharge intensity | Creases | Solution absorbability | Water absorbability under pressure | Changes with time | Perforations |
|---|---|---|---|---|---|---|---|---|---|---|---|
| 57.7 | 182 | 0.93 | 0.65 | CM | 04 | 13.4 | ○ | 34.0 | 28.5 | ◉ | ○ |

TABLE 15

| Areal weight | Thickness | O/C rate Surface | O/C rate Intermediate | Discharge treatment type | Number of electrodes | Discharge intensity | Solution absorbability | Water absorbability under pressure | Changes with time | Perforations |
|---|---|---|---|---|---|---|---|---|---|---|
| 55.2 | 180 | 0.87 | 0.51 | CC | 04 | 15.4 | 30.0 | 28.2 | o | o |

Industrial Utility

As described above, the present non-woven fabric has distinguished electrolyte absorbability and retainability, etc. and can be used suitably as an alkali cell separator.

What is claimed is:

1. A non-woven fabric for an alkali cell separator, said fabric having been subjected to a hydroentangling treatment, wherein said fabric comprises a center surface average roughness (SRa) of not more than 13 μm at streaks of entanglement on at least one side of the non-woven fabric, a maximum pore diameter of not more than 50 μm and a water absorbability under pressure of not less than 20 g/m$^2$.

2. A non-woven fabric for an alkali cell separator according to claim 1, wherein said non-woven fabric includes a web of fibers formed by a wet process, said web of fibers being subjected to the hydroentangling treatment, a corona discharge treatment and then a calender treatment, wherein said fibers are comprised of polyolefin.

3. A process for producing an non-woven fabric for an alkali cell separator, comprising the following steps:
    forming a web of fibers comprised of polyolefin, by a wet process, applying a hydroentangling treatment to a surface of said web by use of columnar water stream jet nozzles each in such a shape that an injection outlet opening is broader than a water stream inlet opening, the jet nozzles being provided in an injector of a hydroentangling apparatus, followed by a corona discharge treatment of the entangled web surface and by a calender treatment thereof.

4. A process for producing a non-woven fabric for an alkali cell separator according to claim 3, wherein the columnar water stream jet nozzles each in such a shape that the injection outlet opening is broader than the water stream inlet opening is provided in the injector at least at the last stage.

5. A non-woven fabric for an alkali cell separator according to claim 1, wherein the non-woven fabric has a standard deviation of pore diameter distribution of not more than 20 μm, as determined by bubble point method and a percentage of number of pores falling within a range of average pore diameter ±2 μm of not less than 35% of total number of pores in the entire non-woven fabric, the non-woven fabric being subjected to a corona discharge treatment.

6. A non-woven fabric for an alkali cell separator, comprising the following:
    fibers comprising polyolefin, wherein the non-woven fabric has a standard deviation of pore diameter distribution of not more than 20 μm, as determined by bubble point method and a percentage of number of pores falling within a range of average pore diameter of ±2 μm of not less than 35% of total number of pores in the entire non-woven fabric, the non-woven fabric being subjected to a corona discharge treatment.

7. A non-woven fabric for an alkali cell separator according to claim 6, wherein the non-woven fabric has a center surface average roughness SRa of not more than 13 μm at streaks of entanglement on at least one side of the non-woven fabric, a maximum pore diameter of not more than 50 μm, and a water absorbability under pressure of not less than 20 g/m$^2$.

8. A non-woven fabric for an alkali cell separator according to claim 6, wherein said non-woven fabric includes a web of fibers formed by a wet process said web being subjected to a corona treatment wherein said fibers are comprised of polyolefin.

9. A non-woven fabric for an alkali cell separator according to claim 6, wherein a web of said fibers formed by a web process, is subjected to a hydroentangling treatment, a corona discharge treatment, and then to a calender treatment, wherein said fibers are comprised of polyolefin.

10. A non-woven fabric for an alkali cell separator comprising a non-woven fabric for an alkali cell separator substantially free from perforations therethrough, formed mainly from fibers comprised of polyolefin, partially containing an ethylene/vinyl alcohol copolymer or cross-linked polyethylene oxide and subjected to a corona discharge treatment, where a peak area ratio of oxygen (O) to carbon (C) (C/O ratio) on the surface of the non-woven fabric is 0.50 to 1.85 and at an intermediate position in the thickness direction thereof the C/O ratio is 0.45 to 1.40, as determined by electron spectroscopy (ESCA).

11. A non-woven fabric for an alkali cell separator according to claim 10, wherein the peak area ratio of oxygen elements (O) to carbon elements (C) (O/C ratio) on the surface of the non-woven fabric for an alkali cell separator and that at the intermediate position in the thickness direction are 0.55 to 1.50 and 0.48 to 1.20, respectively, as determined by electron spectroscopy (ESCA).

12. A non-woven fabric for an alkali cell separator according to claim 10, wherein the non-woven fabric has a center surface average roughness SRa of no more than 13 μm in the crossing direction at the right angle at streaks of entanglement on at least one side thereof, a maximum pore diameter of not more than 50 μm and a water absorbability under pressure of not less than 20 g/m$^2$.

13. A non-woven fabric for an alkali cell separator according to claim 10, wherein the non-woven fabric has a standard deviation of pore diameter distribution of not more than 20 μm, as determined by bubble point method and a percentage of number of pores falling within a range of average pore diameter ±2 μm of not more than 35% of total number of pores in the entire non-woven fabric, the non-woven fabric being subjected to a corona discharge treatment.

14. A non-woven fabric for an alkali cell separator according to claim 10, wherein a web of said fibers formed by a wet process, is subjected to a corona treatment, wherein said fiber are comprised of polyolefin.

15. A non-woven fabric for an alkali cell separator according to claim 10, wherein a web of said fibers, formed by a wet process, is subjected to a corona discharge treatment and then to a calender treatment, wherein said fibers are comprised of polyolefin.

16. A non-woven fabric for an alkali cell separator, comprising a non-woven fabric substantially free from perforations therethrough, formed mainly from finely creased fibers comprised of polyolefin, partially containing an ethylene/vinyl alcohol polymer and having a large number of fine creases on the surface of fibers and subjected to a corona discharge treatment, where a peas ratio of oxygen elements (O) to carbon elements (C) (O/C ratio) on the surface of the non-woven fabric and that at an intermediate position in the thickness direction thereof are 0.60 to 1.35 and 0.50 to 1.00, respectively, as determined by electron spectroscopy (ESCA).

17. A non-woven fabric for an alkali cell separator according to claim 16, wherein the non-woven fabric has a center surface average roughness SRa of not more than 13 $\mu$m in the crossing direction at the right angle at streaks of entanglement on at least one side thereof, a maximum pore diameter of not more than 50 $\mu$m and a water absorbability under pressure of not less than 20 g/m$^2$.

18. A non-woven fabric for an alkali cell separator according to claim 16, wherein the non-woven fabric has a standard deviation of pore diameter distribution of not more than 20 $\mu$m, as determined by bubble point method and a percentage of number of pores falling within a range of average pore diameter ±2 $\mu$m of not more than 35% of total number of pores in the entire non-woven fabric, the non-woven fabric being subjected to a corona discharge treatment.

19. A non-woven fabric for an alkali cell separator according to claim 16, wherein a web of said fibers formed by a wet process, is subjected to a corona treatment, wherein said fibers are comprised of polyolefin.

20. A non-woven fabric for an alkali cell separator according to claim 16, wherein a web of fibers formed by a wet process, is subjected to a hydroentangling treatment, a corona discharge treatment and then to calender treatment, wherein said fibers are comprised of polyolefin.

21. A process for producing a non-woven fabric for an alkali cell separator, comprising the following steps:

forming a non-woven fabric substantially from fibers comprised of polyolefin, partially containing an ethylene/vinyl alcohol copolymer or cross-linked polyethylene oxide, and subjecting the non-woven fabric to a corona discharge treatment by use of multi-electrodes having a round electrode tip end at a discharge intensity of not more than 20.0 w/cm$^2$, thereby making a peak ratio of oxygen elements (O) to carbon elements (C) (O/C ratio) on the surface of the non-woven fabric and that at an intermediate position in the thickness direction thereof 0.05 to 1.85 and 0.45 to 1.40, respectively, as determined by electron spectroscopy (ESCA).

* * * * *